United States Patent
Kwon

(10) Patent No.: US 8,373,834 B2
(45) Date of Patent: Feb. 12, 2013

(54) ARRAY SUBSTRATE FOR IN-PLANE SWITCHING MODE LIQUID CRYSTAL DISPLAY DEVICE HAVING DOUBLE-LAYERED METAL PATTERNS AND METHOD OF FABRICATING THE SAME

(75) Inventor: Oh-Nam Kwon, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 13/566,361

(22) Filed: Aug. 3, 2012

(65) Prior Publication Data

US 2012/0301984 A1 Nov. 29, 2012

Related U.S. Application Data

(62) Division of application No. 13/397,430, filed on Feb. 15, 2012, now Pat. No. 8,259,272, which is a division of application No. 12/461,005, filed on Jul. 29, 2009, now Pat. No. 8,144,296, which is a division of application No. 10/874,185, filed on Jun. 24, 2004, now Pat. No. 7,589,814.

(30) Foreign Application Priority Data

Jun. 24, 2003 (KR) .................. 10-2003-0041166

(51) Int. Cl.
*G02F 1/1343* (2006.01)
(52) U.S. Cl. ........................................... 349/141
(58) Field of Classification Search ................ None
See application file for complete search history.

(56) References Cited

U.S. PATENT DOCUMENTS

| | | | |
|---|---|---|---|
| 6,529,251 B2 | 3/2003 | Hibino et al. | |
| 6,674,495 B1 | 1/2004 | Hong et al. | |
| 6,849,873 B2 | 2/2005 | Baek et al. | |
| 6,916,675 B2 | 7/2005 | Cho | |
| 7,567,326 B2 | 7/2009 | Lee | |
| 2002/0044228 A1 | 4/2002 | Oh et al. | |
| 2002/0051099 A1 | 5/2002 | Moon | |
| 2002/0074549 A1 | 6/2002 | Park et al. | |
| 2002/0117691 A1 | 8/2002 | Choi et al. | |
| 2002/0176032 A1 | 11/2002 | Maeda et al. | |
| 2003/0038899 A1 | 2/2003 | Lin | |
| 2003/0038903 A1 | 2/2003 | Kobayashi et al. | |

(Continued)

FOREIGN PATENT DOCUMENTS

KR 10-1998-0072232 11/1998
KR 10-1999-0079262 11/1999

(Continued)

*Primary Examiner* — Thanh-Nhan P Nguyen
(74) *Attorney, Agent, or Firm* — McKenna Long & Aldridge, LLP

(57) ABSTRACT

An array substrate of an in-plane switching liquid crystal display device includes, among other features, a gate electrode and a gate line having a first double-layered structure consisting of a first barrier layer and a first low resistance metallic layer; a data line defining a pixel region with the gate line, the data line having a second double-layered structure consisting of a second barrier layer and a second low resistance metallic layer; a plurality of common electrodes disposed in a direction opposite to an adjacent gate line; a thin film transistor (TFT) near a crossing of the gate and data lines, each of the source and drain electrodes of the TFT having the same double-layered structure as the data line; and a plurality of pixel electrodes arranged in an alternating pattern with the common electrodes and disposed in the direction opposite the adjacent gate line.

10 Claims, 44 Drawing Sheets

U.S. PATENT DOCUMENTS

| | | |
|---|---|---|
| 2003/0081160 A1 | 5/2003 | Ihida et al. |
| 2004/0080700 A1 | 4/2004 | Kang |
| 2004/0149990 A1 | 8/2004 | Oh et al. |
| 2004/0189919 A1 * | 9/2004 | Ahn et al. ............ 349/141 |
| 2004/0195574 A1 | 10/2004 | Ahn et al. |
| 2005/0041170 A1 | 2/2005 | Chae |

FOREIGN PATENT DOCUMENTS

| | | |
|---|---|---|
| KR | 10-2000-0014539 | 3/2000 |
| KR | 10-2000-0033840 | 6/2000 |
| KR | 10-2001-0015041 | 2/2001 |

* cited by examiner

ARRAY SUBSTRATE FOR IN-PLANE SWITCHING MODE LIQUID CRYSTAL DISPLAY DEVICE HAVING DOUBLE-LAYERED METAL PATTERNS AND METHOD OF FABRICATING THE SAME

CROSS-REFERENCE TO RELATED APPLICATIONS

This application is a Divisional application of Ser. No. 13/397,430 filed Feb. 15, 2012 now U.S. Pat. No. 8,259,272, now allowed, which is a Divisional of application Ser. No. 12/461,005 filed Jul. 29, 2009, now U.S. Pat. No. 8,144,296, which is a Divisional of application Ser. No. 10/874,185 filed Jun. 24, 2004, now U.S. Pat. No. 7,589,814; which claim priority to Korean Patent Application No. 10-2003-0041166, filed Jun. 24, 2003 all of which are hereby incorporated by reference for all purposes as if fully set forth herein.

BACKGROUND OF THE INVENTION

1. Field of the Invention

The present invention relates to liquid crystal display devices. More particularly, the present invention relates to liquid crystal display devices implementing in-plane switching (IPS) where an electric field applied to liquid crystals is generated in a plane parallel to a substrate.

2. Discussion of the Related Art

A liquid crystal display device uses the optical anisotropy and polarization properties of liquid crystal molecules to produce an image. Liquid crystal molecules have a definite orientational alignment as a result of their long, thin shapes. The alignment direction can be controlled by an applied electric field. In other words, as an applied electric field changes, so does the alignment of the liquid crystal molecules. Due to the optical anisotropy, the refraction of incident light depends on the alignment direction of the liquid crystal molecules. Thus, by properly controlling an applied electric field, a desired light image can be produced.

Of the different types of known liquid crystal displays (LCDs), active matrix LCDs (AM-LCDs), which have thin film transistors (TFTs) and pixel electrodes arranged in a matrix form, are the subject of significant research and development because of their high resolution and superiority in displaying moving images.

LCD devices have wide application in office automation (OA) equipment and video units because they are light and thin and have low power consumption characteristics. The typical liquid crystal display panel has an upper substrate, a lower substrate and a liquid crystal layer interposed therebetween. The upper substrate, commonly referred to as a color filter substrate, usually includes a common electrode and color filters. The lower substrate, commonly referred to as an array substrate, includes switching elements, such as thin film transistors and pixel electrodes.

LCD device operation is based on the principle that the alignment direction of the liquid crystal molecules is dependent upon an electric field applied between the common electrode and the pixel electrode. Thus, the alignment direction of the liquid crystal molecules is controlled by the application of an electric field to the liquid crystal layer. When the alignment direction of the liquid crystal molecules is properly adjusted, incident light is refracted along the alignment direction to display image data. The liquid crystal molecules function as an optical modulation element having variable optical characteristics that depend upon polarity of the applied voltage.

In a related art LCD device, the pixel and common electrodes are positioned on the lower and upper substrates, respectively, and the electric field induced between the pixel and common electrodes is substantially perpendicular to the lower and upper substrates. However, these related art LCD devices have a very narrow viewing angle. In order to solve the problem of narrow viewing angle, in-plane switching liquid crystal display (IPS-LCD) devices have been proposed. The IPS-LCD devices typically include a lower substrate in which a pixel electrode and a common electrode are disposed, an upper substrate having no electrode, and a liquid crystal interposed between the upper and lower substrates. A detailed explanation of a related art IPS-LCD panel will be provided with reference to FIG. 1.

FIG. 1 is a plan view illustrating an array substrate for use in a related art IPS-LCD device. As shown in FIG. 1, a plurality of gate lines 14 are disposed in a transverse direction and spaced apart from each other by a predetermined distance. A plurality of common lines 18 are also disposed parallel to the gate lines 14, and each common line 18 is adjacent to each gate line 14. A plurality of data lines 30 are disposed in a longitudinal direction substantially perpendicular to the gate and data lines 14 and 18. Pairs of the gate and data lines 14 and 30 define a pixel region P. A gate pad 16 is disposed at one end of each gate line 14, and a data pad 40 is disposed at one end of each data line 30. Near a crossing of the gate and data lines 14 and 30, a thin film transistor T is provided including a gate electrode 12, an active layer 26, a source electrode 32, and a drain electrode 34. The gate electrode 12 extends from the gate line 14, whereas the source electrode 32 extends from the data line 30. The active layer 26 is disposed over the gate electrode 12, and the source and drain electrodes 32 and 34 are in contact with the active layer 26.

In the pixel region P, a plurality of pixel electrodes 38 are substantially parallel to the data lines 30. The plurality of pixel electrodes 38 are electrically connected to the drain electrode 34 of the thin film transistor T. A plurality of common electrodes 20 are also disposed within the pixel region P and substantially parallel to the data lines 30. The common electrodes 20 are substantially perpendicular to and connected to the common line 18. The common electrodes 20 are arranged in an alternating pattern with the pixel electrodes 30.

In the pad portions where the gate and data pads 16 and 50 are located, there are provided gate pad electrodes 48 and data pad electrodes 50. The gate pad electrodes 48 contact the gate pads 16, respectively, and the data pad electrodes 50 contact the data pads 40, respectively.

In the above illustrated array substrate for use in the IPS-LCD panel, the source and drain electrodes 32 and 34 and the data lines 30 are usually single-layered patterns formed of molybdenum (Mo) or chromium (Cr). However, the Mo and Cr metals have a high electrical resistance, the array substrate including the Mo or Cr patterns may not be used for an IPS-LCD panel that requires a large size and an ultra high resolution.

FIGS. 2A-2D, 3A-3D, 4A-4D and 5A-5D are cross sectional views taken along lines II-II, III-III, IV-IV and V-V of FIG. 1, respectively, and illustrate the process of forming the array substrate of FIG. 1 according to a related art.

In FIGS. 2A, 3A, 4A and 5A, a conductive metallic material, for example, aluminum (Al) or aluminum alloy, is deposited on a substrate 10, and then patterned using a first mask (not shown), to form a gate electrode 12, a gate line 14, a gate pad 16, a common line 18, and a plurality of common electrodes 20. As described with reference to FIG. 1, the gate and common lines 14 and 18 are formed adjacent to and parallel to each other. The gate electrode 12 extends from the gate line 14, and the gate pad 16 is disposed at one end of the gate line 14. The common electrodes 20 perpendicularly extend from the common line 18 in a direction opposite to the adjacent gate line. After patterning the conductive metallic material, a gate insulating layer 24 is formed over an entire surface of the substrate 10 to cover all of the gate electrode 12, the gate line 14, the gate pad 16, the common line 18, and the plurality of common electrodes 20.

In FIGS. 2B, 3B, 4B and 5B, pure amorphous silicon (a-Si:H) and doped amorphous silicon (n+a-Si:H) are sequentially deposited on the gate insulating layer 24, and then patterned using a second mask, to form an active layer 26 and an ohmic contact layer 28 on the gate insulating layer 24 in series. Especially, the active and ohmic contact layers 26 and 28 are disposed over the gate electrode 12.

Next in FIGS. 2C, 3C, 4C and 5C, a second metallic material (e.g., chromium or molybdenum) is deposited over the gate insulating layer 24 and covers the active and ohmic contact layers 26 and 28. Thereafter, the second metallic material is patterned by a third mask process, to form a data line 30, a source electrode 32 and a drain electrode 34. The data line 30 perpendicularly crosses the gate line (reference 14 of FIG. 1), and defines a pixel region P. The source electrode 32 extends from the data line 30, and contacts the ohmic contact layer 28. The drain electrode 34 is spaced apart from the source electrode across the gate electrode 12, and also contacts the ohmic contact layer 28. When patterning the second metallic material in order to form the data line 30, a plurality of pixel electrodes 38 are also formed on the gate insulating layer 38. Each pixel electrode 38 being parallel with the data line 30 is disposed between the common electrodes 20. Additionally, a gate pad 40 is formed at one end of the gate line 30. After patterning the second metallic material, a passivation layer 42 is formed over an entire surface of the substrate 10 to cover all of the data line 30, the source and drain electrodes 32 and 34, the pixel electrodes 38, and the data pad 40. The passivation layer 42 is silicon oxide (SiO2) or silicon nitride (SiNX). Thereafter, the passivation layer 42 is patterned using a fourth mask to form a gate pad contact hole 44 and a data pad contact hole 46. The gate pad contact hole 44 exposes a portion of the gate pad 16, whereas the data pad contact hole 46 exposes a portion of the data pad 40, as shown in FIGS. 4C and 5C.

In FIGS. 2D, 3D, 4D and 5D, a transparent conductive material, for example, indium tin oxide (ITO), is deposited on the passivation layer 42 and then patterned using a fifth mask. Thus, a gate pad electrode 48 contacting the gate pad 16 is formed, and a data pad electrode 50 contacting the data pad 40 is also formed.

However, the array substrate fabricated by the above-mentioned process has some disadvantages. Because the data lines and the source and drain electrodes are all formed of the metallic material having a low electrical resistance, for example, molybdenum (Mo) or chromium (Cr), the array substrate is not adequate in a LCD panel requiring a ultra high resolution.

SUMMARY OF THE INVENTION

Accordingly, the present invention is directed to an array substrate for an in-plane switching mode liquid crystal display LCD device and method of manufacturing the same that substantially obviates one or more of the problems due to limitations and disadvantages of the related art.

An advantage of the present invention is to provide an array substrate and a method of forming the array substrate for use in an IPS-LCD device which have a double-layered metallic patterns in order to reduce a signal delay in the lines.

Another advantage of the present invention is to provide a method of forming the array substrate for use in an IPS-LCD device which provides a reduced fabrication process and decreases processing costs.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages, and in accordance with the purpose of the present invention, as embodied and broadly described, an array substrate for an in-plane switching liquid crystal display device comprising a gate line disposed in a first direction on a substrate; a gate electrode extending from the gate line, wherein the gate electrode and the gate line have a first double-layered structure consisting of a first barrier layer and a first low resistance metallic layer; a gate pad connected to one end of the gate line; a common line substantially parallel and adjacent to the gate line; a data line disposed in a second direction and defining a pixel region with the gate line, wherein the data line has a second double-layered structure consisting of a second barrier layer and a second low resistance metallic layer; a data pad disposed at one end of the data line; a plurality of common electrodes extending from the common line to the pixel region and disposed in a direction opposite to the adjacent gate line; a thin film transistor disposed near a crossing of the gate and data lines, the thin film transistor including a semiconductor layer, the gate electrode, a source electrode, and a drain electrode, wherein each of the source and drain electrodes has the same double-layered structure as the data line; and a plurality of pixel electrodes disposed in the direction opposite the adjacent gate lines and connected to the drain electrode, wherein the pixel electrodes are arranged in an alternating pattern with the common electrodes.

In another aspect, a method of forming an array substrate for use in an in-plane switching liquid crystal display device is provided. The method includes forming a gate line and a gate electrode on a substrate, the gate line being disposed in a first direction and the gate electrode extending from the gate line, wherein the gate electrode and the gate line have a first double-layered structure consisting of a first barrier layer and a first low resistance metallic layer; forming a gate pad connected to one end of the gate line; forming a common line substantially parallel and adjacent to the gate line; forming a data line in a second direction, the data line defining a pixel region with the gate line, wherein the data line has a second double-layered structure consisting of a second barrier layer and a second low resistance metallic layer; forming a data pad at one end of the data line; forming a plurality of common electrodes in a direction opposite to an adjacent gate line, the common electrodes extending from the common line to the pixel region; forming a thin film transistor near a crossing of the gate and data lines, the thin film transistor including a semiconductor layer, the gate electrode, a source electrode, and a drain electrode, wherein each of the source and drain electrodes has the same double-layered structure as the data line; and forming a plurality of pixel electrodes in the direction opposite the adjacent gate lines and connected to the drain electrode, wherein the pixel electrodes are arranged in an alternating pattern with the common electrodes.

In another aspect, a method of forming an array substrate for use in an in-plane switching liquid crystal display device is provided. The method includes sequentially forming a first barrier layer and a first low resistance metallic layer on a substrate; simultaneously patterning the first barrier layer and the first low resistance metallic layer using a first mask process to form a gate line, a gate electrode, a gate pad and a plurality of common electrodes on the substrate, wherein the gate line is disposed in a first direction, the gate pad is connected to one end of the gate line, the gate electrode extends from the gate line, and the plurality of common electrodes are disposed in a direction opposite to an adjacent gate line, and wherein the gate electrode and the gate line have a first double-layered structure consisting of the first barrier layer and the first low resistance metallic layer; forming a gate insulating layer over the substrate to cover the gate line, the gate electrode, the gate pad and the plurality of common electrodes; forming an active layer and an ohmic contact layer on the gate insulating layer using a second mask, the active layer and the ohmic contact layer disposed over the gate electrode; sequentially forming a second barrier layer and a second low resistance metallic layer on the gate insulating layer to cover the active and ohmic contact layers; simultaneously patterning the second barrier layer and the second low resistance metallic layer using a third mask to form a data line in a second direction, a data pad at one end of the data line, a source electrode extending from the data line, a drain electrode spaced apart from the source electrode across the gate electrode, and a plurality of pixel electrodes in the direction opposite the adjacent gate line and arranged in an alternating pattern with the common electrodes, wherein the data line defines a pixel region with the gate line, the pixel electrodes are connected to the drain electrode, and the data line and the source and drain electrodes have a second double-layered structure consisting of the second barrier layer and the second low resistance metallic layer; forming a passivation layer over the gate insulating layer to cover the data line, the data pad, the source electrode, the drain electrode, and the plurality of pixel electrodes; and patterning the passivation layer using a fourth mask to form a gate pad contact hole and a data pad contact hole, the gate pad contact hole exposing the gate pad and the data pad contact hole exposing the data pad.

In another aspect, a method of forming an array substrate for an in-plane switching liquid crystal display device is provided. The method includes sequentially forming a first barrier layer and a first low resistance metallic layer on a substrate; simultaneously patterning the first barrier layer and the first low resistance metallic layer using a first mask process to form a gate line, a gate electrode, a gate pad and a plurality of common electrodes on the substrate, wherein the gate line is disposed in a first direction, the gate pad is connected to one end of the gate line, the gate electrode extends from the gate line, and the plurality of common electrodes are disposed in a direction opposite to an adjacent gate line, and wherein the gate electrode and the gate line have a first double-layered structure consisting of the first barrier layer and the first low resistance metallic layer; forming a gate insulating layer over the substrate to cover the gate line, the gate electrode, the gate pad and the plurality of common electrodes; sequentially forming a pure amorphous silicon layer, a doped amorphous silicon layer, a second barrier layer and a second low resistance on the gate insulating layer; simultaneously patterning the pure and doped amorphous silicon layers and the second barrier and low resistance metallic layers using a second mask process to form a data line in a second direction, a data pad at one end of the data line, a source electrode extending from the data line, a drain electrode spaced apart from the source electrode across the gate electrode, a plurality of pixel electrodes in the direction opposite the adjacent gate line and arranged in an alternating pattern with the common electrodes, and a plurality of semiconductor layer under the data line, the data pad, the source and drain electrodes, and the plurality of pixel electrodes, wherein the semiconductor layer is a double-layered structure consisting of a first layer of pure amorphous silicon and a second layer of doped amorphous silicon, and wherein the data line defines a pixel region with the gate line, the pixel electrodes is connected to the drain electrode, and the data line and the source and drain electrodes have a second double-layered structure consisting of the second barrier layer and the second low resistance metallic layer; forming a passivation layer over the gate insulating layer to cover the data line, the data pad, the source electrode, the drain electrode, the plurality of pixel electrodes; and patterning the passivation layer using a third mask process to form a gate pad contact hole and a data pad contact hole, the gate pad contact hole exposing the gate pad and the data pad contact hole exposing the data pad.

In another aspect, a method of forming an array substrate for an in-plane switching liquid crystal display device is provided. The method includes providing first and second substrates; sequentially forming a first barrier layer and a first low resistance metallic layer on the first substrate; simultaneously patterning the first barrier layer and the first low resistance metallic layer using a first mask process to form a gate line, a gate electrode, a gate pad and a plurality of common electrodes on the first substrate, wherein the gate line is disposed in a first direction, the gate pad is connected to one end of the gate line, the gate electrode extends from the gate line, and the plurality of common electrodes are disposed in a second direction opposite to an adjacent gate line, and wherein the gate electrode and the gate line have a first double-layered structure consisting of the first barrier layer and the first low resistance metallic layer; forming a gate insulating layer over the first substrate to cover the gate line, the gate electrode, the gate pad and the plurality of common electrodes; forming an active layer and an ohmic contact layer on the gate insulating layer using a second mask, the active layer and the ohmic contact layer disposed over the gate electrode; sequentially forming a second barrier layer and a second low resistance metallic layer on the gate insulating layer to cover the active and ohmic contact layers; simultaneously patterning the second barrier layer and the second low resistance metallic layer using a third mask to form a data line in the second direction, a data pad at one end of the data line, a source electrode extending from the data line, a drain electrode spaced apart from the source electrode across the gate electrode, and a plurality of pixel electrodes in the second direction and connected to the drain electrode, wherein the pixel electrodes are arranged in an alternating pattern electrodes, wherein the data line defines a pixel region with the gate line, and the data line and the source and drain electrodes have a second double-layered structure consisting of the second barrier layer and the second low resistance metallic layer; forming a passivation layer over the gate insulating layer to cover the data line, the data pad, the source electrode, the drain electrode, and the plurality of pixel electrodes; attaching the second substrate to the first substrate using a sealant; cropping peripheral portions of the second substrate to expose gate and data portions; and etching a portion of the passivation layer corresponding to the gate and data portions to expose the gate and data pads.

In another aspect, a method of forming an array substrate for an in-plane switching liquid crystal display device is provided. The method includes providing first and second substrates; sequentially forming a first barrier layer and a first low resistance metallic layer on a first substrate; simultaneously patterning the first barrier layer and the first low resistance metallic layer using a first mask process to form a gate line, a gate electrode, a gate pad and a plurality of common electrodes on the first substrate, wherein the gate line is disposed in a first direction, the gate pad is connected to one end of the gate line, the gate electrode extends from the gate line, and the plurality of common electrodes are disposed in a second direction opposite to an adjacent gate line, and wherein the gate electrode and the gate line have a first double-layered structure consisting of the first barrier layer and the first low resistance metallic layer; forming a gate insulating layer over the first substrate to cover the gate line, the gate electrode, the gate pad and the plurality of common electrodes; sequentially forming a pure amorphous silicon layer, a doped amorphous silicon layer, a second barrier layer and a second low resistance on the gate insulating layer; simultaneously patterning the pure and doped amorphous silicon layers and the second barrier and low resistance metallic layers using a second mask process to form a data line in the second direction, a data pad at one end of the data line, a source electrode extending from the data line, a drain electrode spaced apart from the source electrode across the gate electrode, a plurality of pixel electrodes in the second direction and arranged in an alternating pattern with the common electrodes, and a plurality of semiconductor layer under the data line, the data pad, the source and drain electrodes, and the plurality of pixel electrodes, wherein the semiconductor layer is a double-layered structure consisting of a first layer of pure amorphous silicon and a second layer of doped amorphous silicon, and wherein the data line defines a pixel region with the gate line, the pixel electrodes are connected to the drain electrode, and the data line and the source and drain electrodes have a second double-layered structure consisting of the second barrier layer and the second low resistance metallic layer; forming a passivation layer over the gate insulating layer to cover the data line, the data pad, the source electrode, the drain electrode, and the plurality of pixel electrodes; attaching the second substrate to the first substrate using a sealant; cropping peripheral portions of the second substrate to expose gate and data portions; and etching a portion of the passivation layer corresponding to the gate and data portions to expose the gate and data pads.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the present invention and together with the description serve to explain the principles of that invention.

In the drawings.

DETAILED DESCRIPTION OF THE ILLUSTRATED EMBODIMENTS

Reference will now be made in detail to embodiments of the present invention, examples of which are shown in the accompanying drawings. Wherever possible, similar reference numbers will be used throughout the drawings to refer to the same or similar parts.

Figure 1:
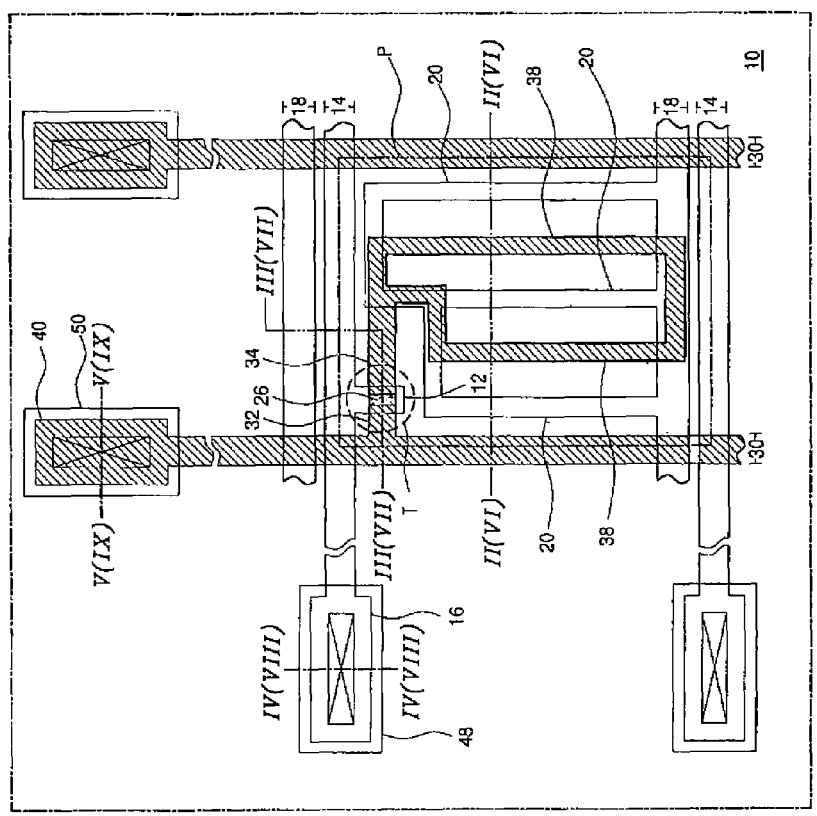
FIG. 1 is a plan view illustrating an array substrate for use in a related art IPS-LCD device.
Figure 2A:
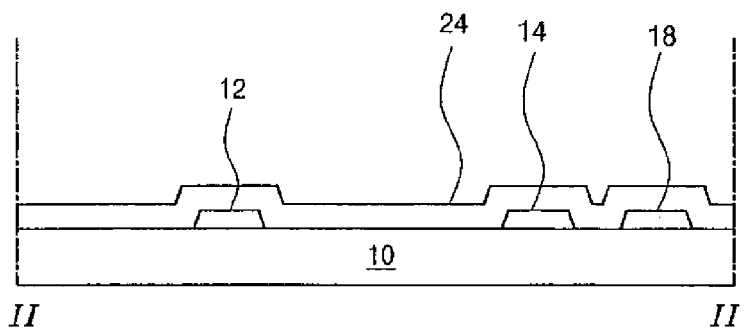
FIGS. 2A-2D, 3A-3D, 4A-4D and 5A-5D are cross sectional views taken along lines II-II, III-III, IV-IV and V-V of FIG. 1, respectively, and illustrate the process of forming the array substrate of FIG. 1 according to the related art.
Figure 2B:
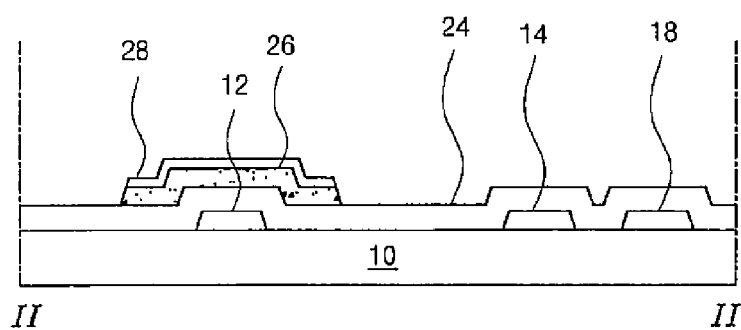
Figure 2C:
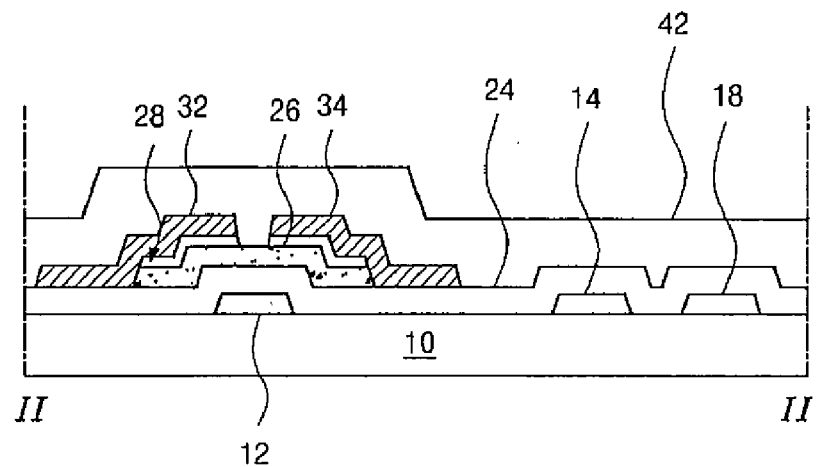
Figure 2D:
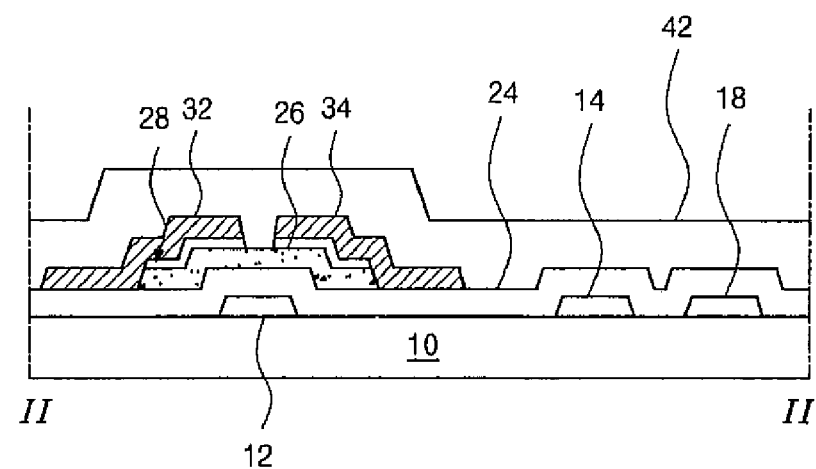
Figure 3A:
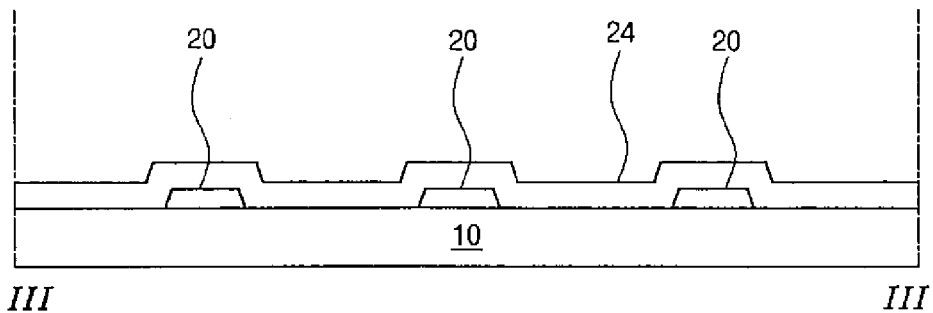
Figure 3B:
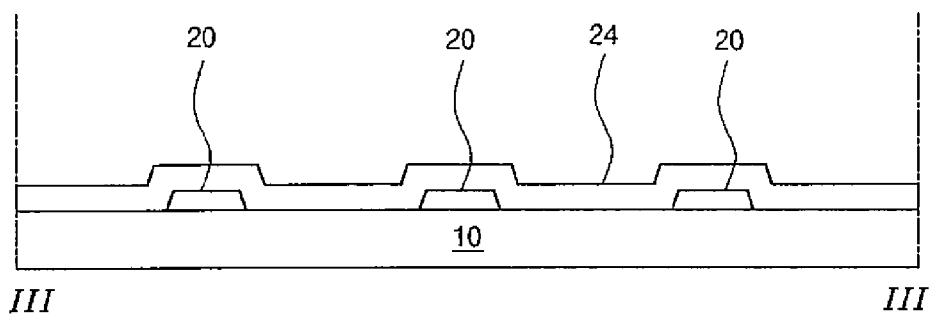
Figure 3C:
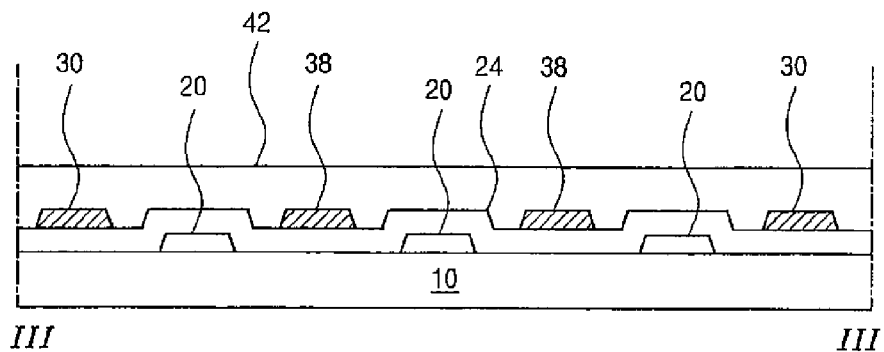
Figure 3D:
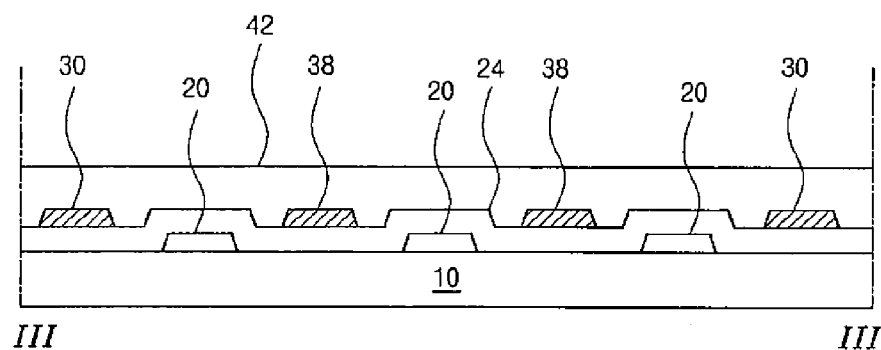
Figure 4A:
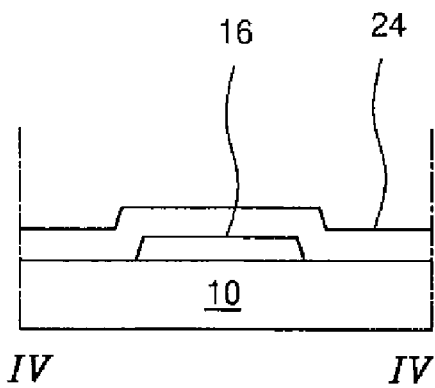
Figure 4B:
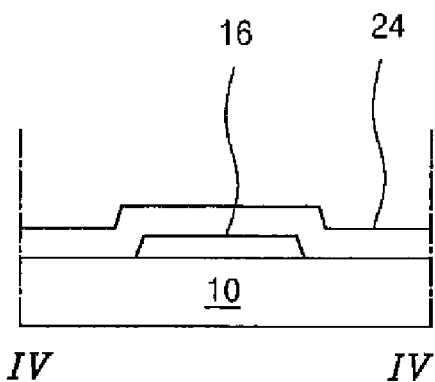
Figure 4C:
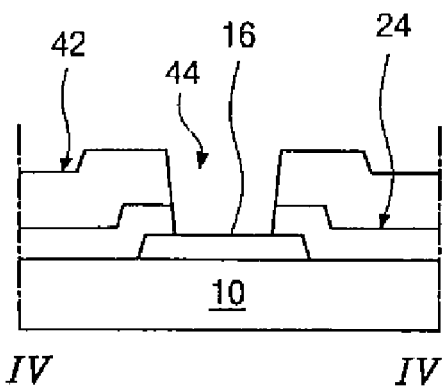
Figure 4D:
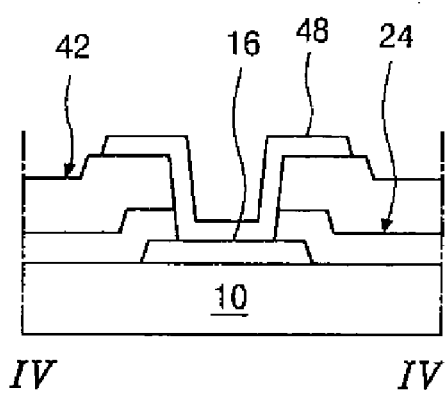
Figure 5A:
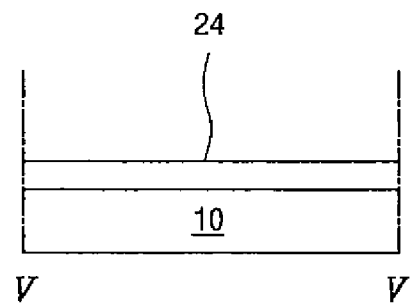
Figure 5B:
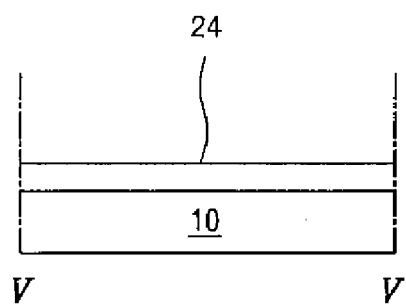
Figure 5C:
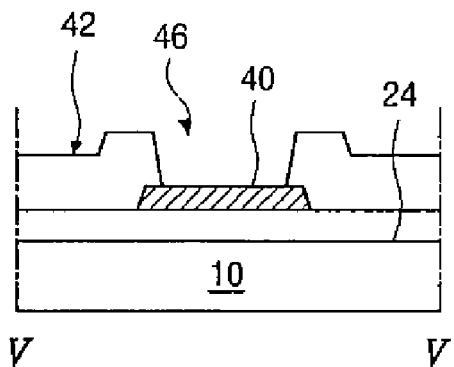
Figure 5D:
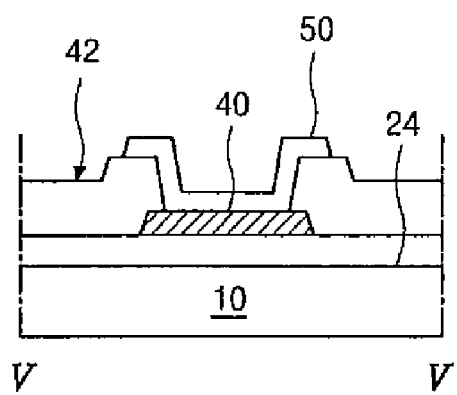

FIGS. 6A-6F, 7A-7F, 8A-8F and 9A-9F are cross sectional views taken along lines VI-VI, VII-VII, VIII-VIII and IX-IX of FIG. 1, respectively, and illustrate the process of forming the array substrate according to a first embodiment of the present invention. A discussion of elements similar to those in FIG. 1 are omitted. In the first embodiment, the array substrate is fabricated using a five-mask process, and includes double-layered metal patterns consisting of a first layer of titanium (Ti) and a second layer of copper (Cu).

In FIGS. 6A, 7A, 8A and 9A, titanium (Ti) and copper (Cu) are sequentially deposited on a substrate 100, to form a first Ti layer 102 and a first Cu layer 104 in series. The first Ti layer 102 may have a thickness of about 100-150 angstroms (Å) or about 1000 angstroms (Å), and the first Cu layer 104 may have a thickness of about 1500-2000 angstroms (Å). The first Ti layer 102 functions as a barrier layer that helps the first Cu layer 104 to adhere to the substrate 100. Specifically, because the first Cu layer 104 does not adhere well to the substrate 100, the first Ti layer 102 compensates and increases the adherence between the substrate 100 and the first Cu layer 104.

In FIGS. 6B, 7B, 8B and 9B, the first Ti layer 102 and the first Cu layer 104 are simultaneously patterned using a first mask process to form a gate electrode 106, a gate line 108 and a gate pad 110. Additionally, a common line 112 and a plurality of common electrodes 114 are formed. The gate and common lines 108 and 112 are formed adjacent to and substantially parallel to each other. The gate electrode 106 extends from the gate line 108, and the gate pad 110 is disposed at one end of the gate line 108. The common electrodes 114 are substantially perpendicular to and extend from the common line 112 in a direction opposite to the adjacent gate line.

When patterning the double-layered metal layer of Ti and Cu, a mixed solution is used. The mixed solution includes hydrogen peroxide ($H_2O_2$), an etching agent, a solution having fluoride (F), and an additive for controlling an etch profile. The etching agent includes $SO_4$ components (i.e., 2 $KHSO_5$, $KHSO_4$, $K_2SO_4$), COOH components (i.e., acetic acid), or PO$_4$ components. The solution having fluoride (F) is hydrogen fluoride (HF) or ammonium fluoride (NH$_4$F), for example.

After patterning the Ti and Cu layers 102 and 104, a gate insulating layer 116 is formed over an entire surface of the substrate 100 to cover all the first double-layered metal patterns, such as the gate electrode 106, the gate line 108, the gate pad 110, the common line 112, and the plurality of common electrodes 114. The gate insulating layer 116 is an inorganic material, for example, silicon nitride (SiN$_x$) or silicon oxide (SiO$_2$).

Next in FIGS. 6C, 7C, 8C and 9C, pure amorphous silicon (a-Si:H) and doped amorphous silicon (n+a-Si:H) are sequentially deposited on the gate insulating layer 116, and then patterned using a second mask. Thus, an active layer 118 and an ohmic contact layer 120 are formed in series on the gate insulating layer 116. The active and ohmic contact layers 118 and 120 are disposed over the gate electrode 106. After that, titanium (Ti) and copper (Cu) are sequentially deposited on the gate insulating layer 116 to cover the active and ohmic contact layers 118 and 120, to form a second Ti layer 122 and a second Cu layer 124.

Now in FIGS. 6D, 7D, 8D and 9D, the second Ti and Cu layers 122 and 124 are simultaneously patterned using a third mask to form second double-layered metal patterns, such as a source electrode 126, a drain electrode 128, a data line 130, a data pad 132, and a plurality of pixel electrodes 134. The data line 130 is substantially perpendicular to and crosses the gate and common lines 108 and 112 to define a pixel region P. The source electrode 126 extends from the data line 130 and contacts the ohmic contact layer 120. The drain electrode 128 is spaced apart from the source electrode 126 across the gate electrode 106, and also contacts the ohmic contact layer 120. The data pad 132 is disposed at one end of the data line 130. Each pixel electrode 134 is substantially parallel to the data line 130 and disposed between the common electrodes 114. The plurality of pixel electrodes 134 are electrically connected to the drain electrode 128.

Figure 6A:
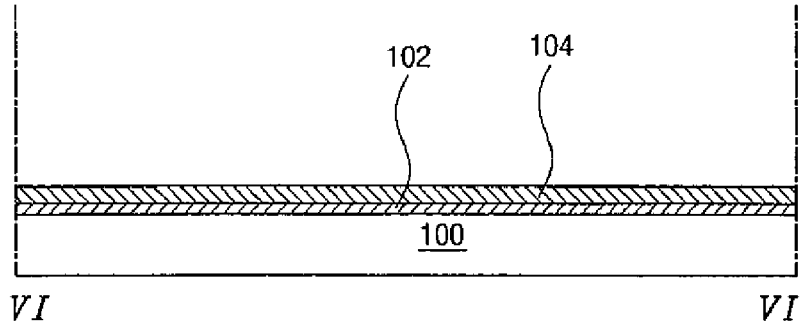
FIGS. 6A-6F, 7A-7F, 8A-8F and 9A-9F are cross sectional views taken along lines VI-VI, VII-VII, VIII-VIII and IX-IX of FIG. 1, respectively, and illustrate the process of forming the array substrate of FIG. 1 according to a first embodiment of the present invention.
Figure 6B:
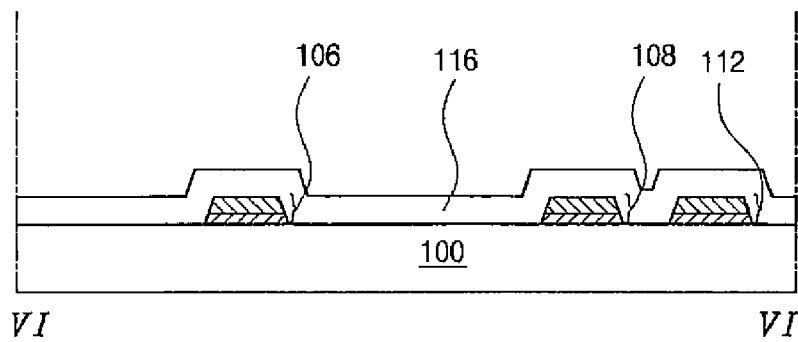
Figure 6C:
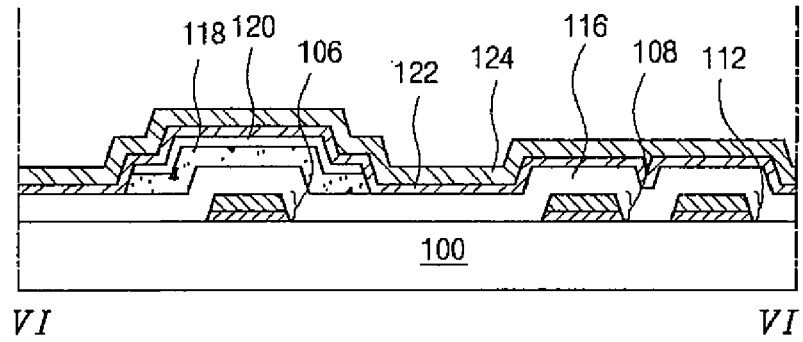
Figure 6D:
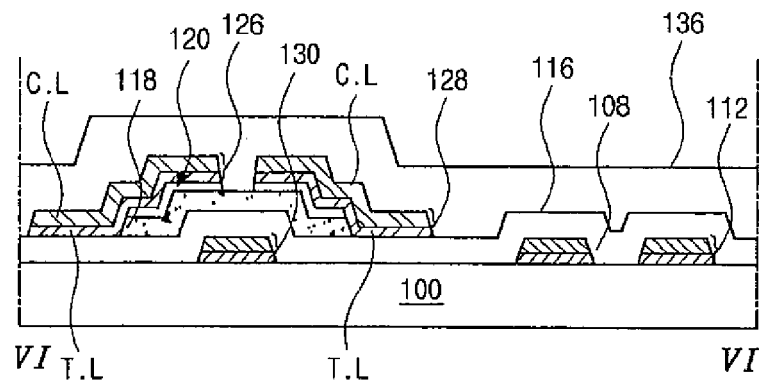
Figure 6E:
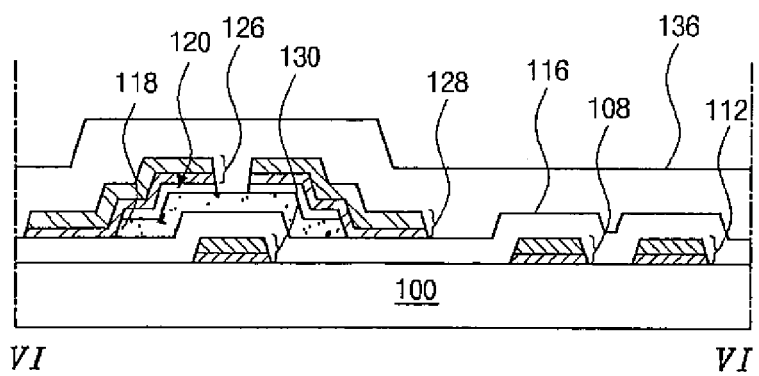
Figure 6F:
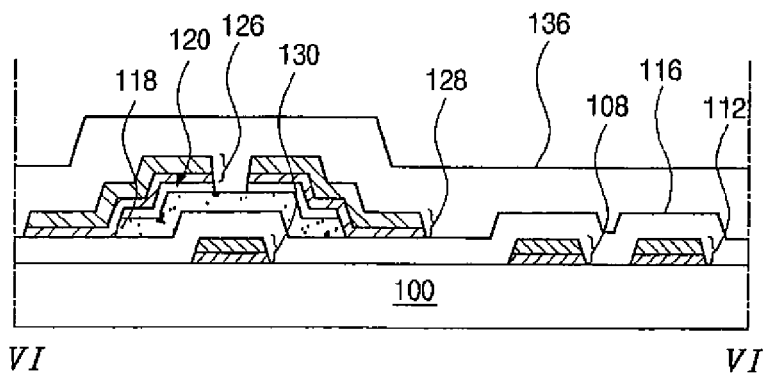
Figure 7A:
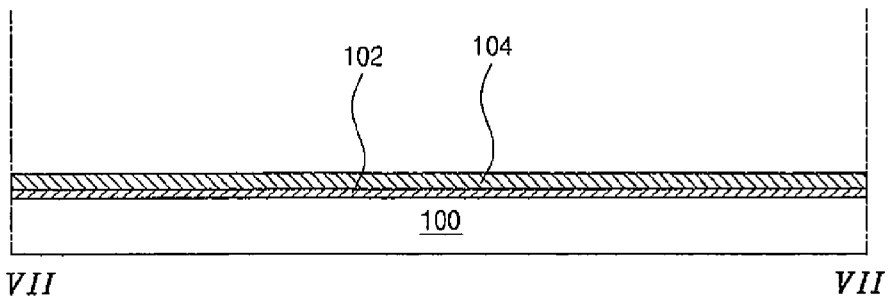
Figure 7B:
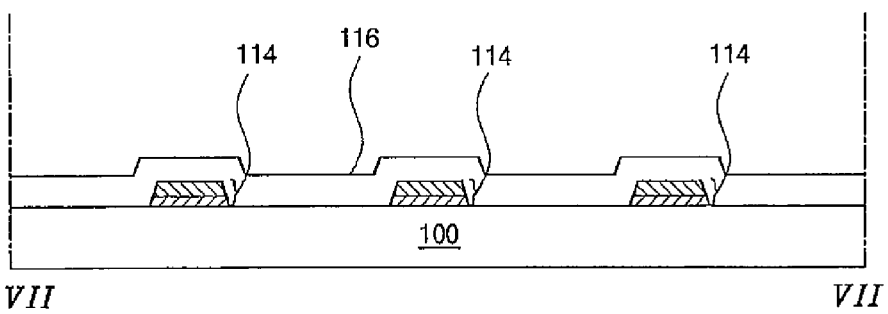
Figure 7C:
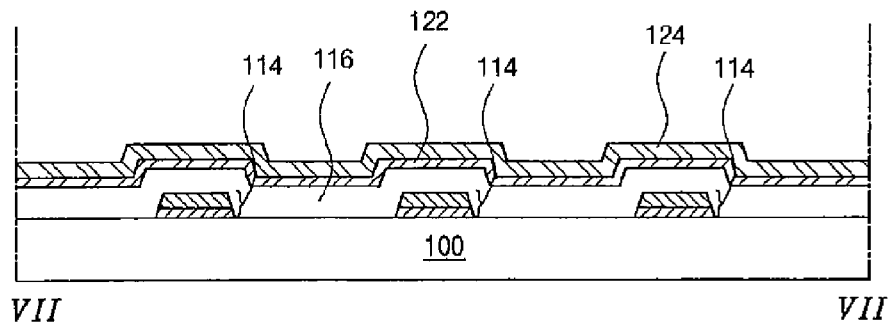
Figure 7D:
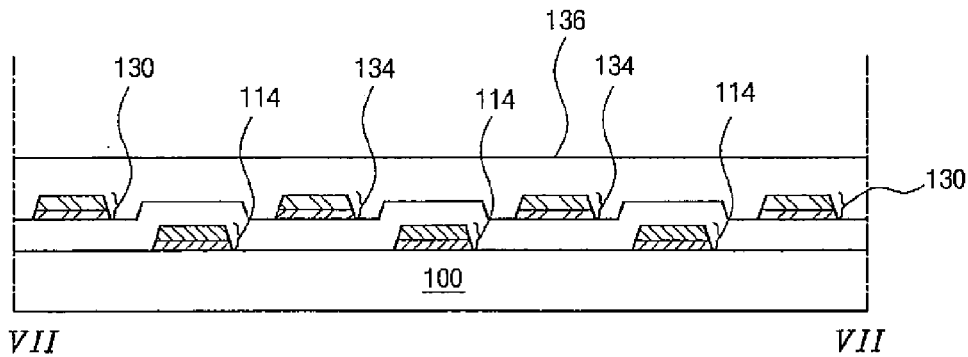
Figure 7E:
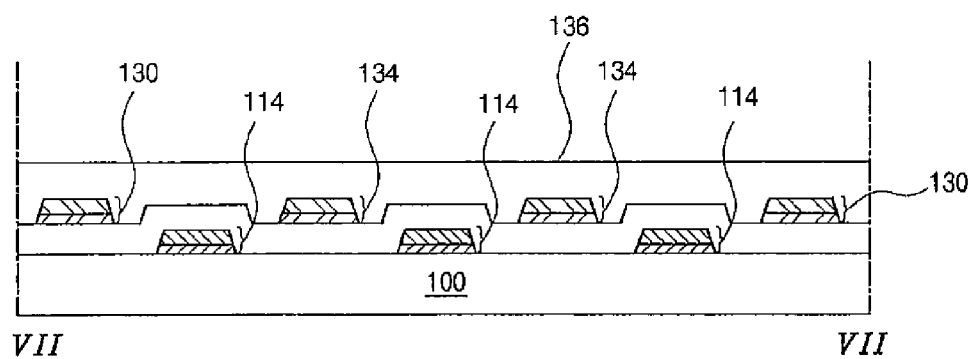
Figure 7F:
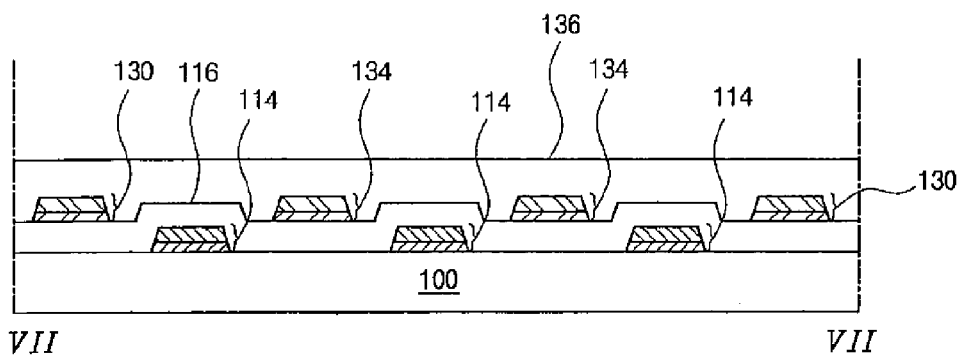
Figure 8A:
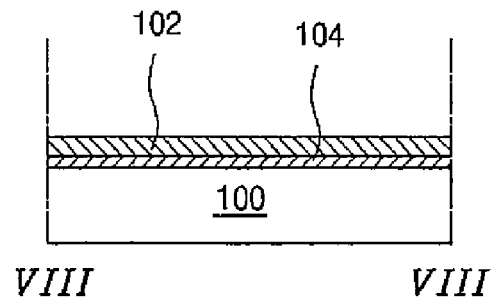
Figure 8B:
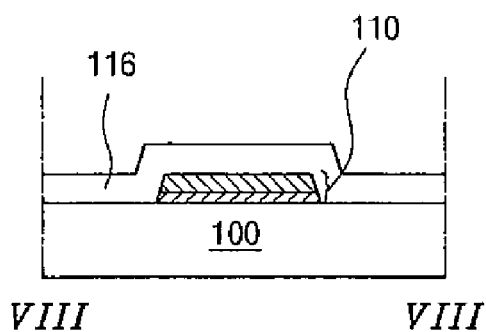
Figure 8C:
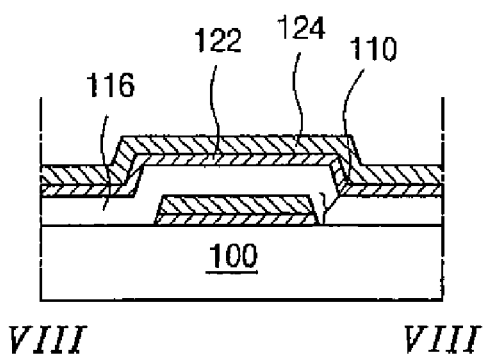
Figure 8D:
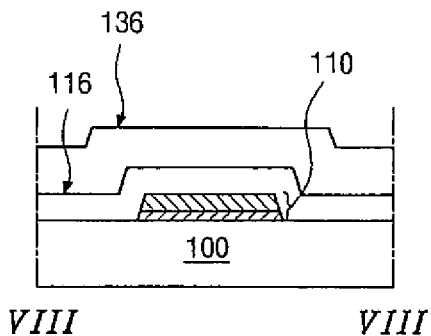
Figure 8E:
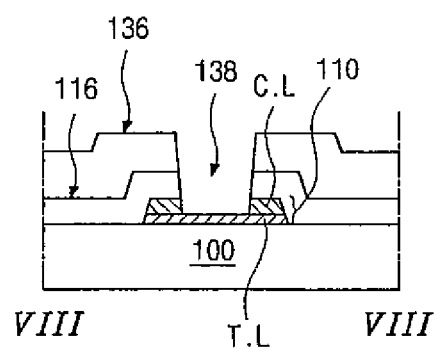
Figure 8F:
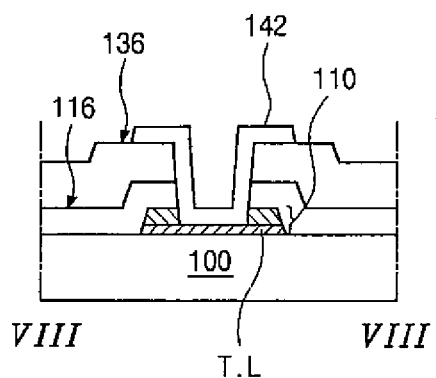
Figure 9A:
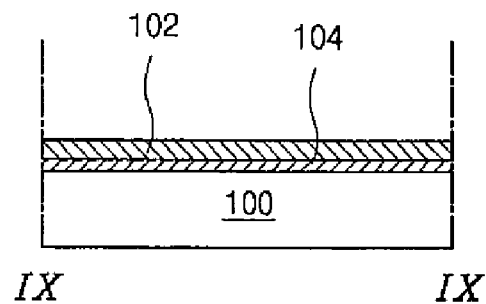
Figure 9B:
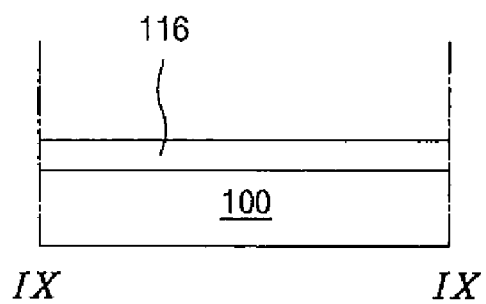
Figure 9C:
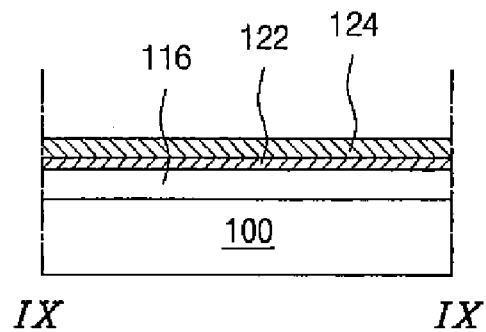
Figure 9D:
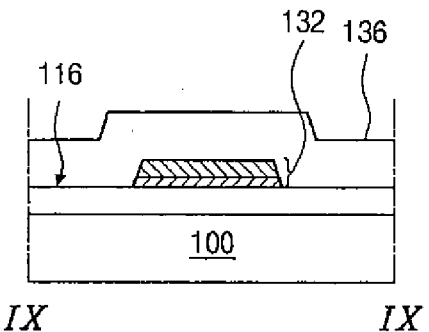
Figure 9E:
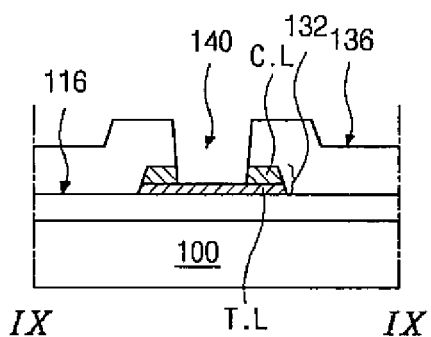
Figure 9F:
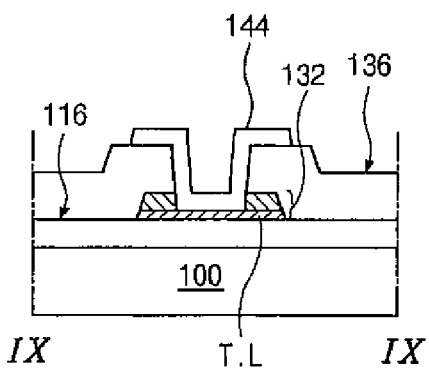

As described in FIG. 6D, each of the source and drain electrodes 126 and 128 consists of a first layer T.L of titanium (Ti) and a second layer C.L of copper (Cu). The first layer T.L directly contacts the underlying ohmic contact layer 120 so that it prevents the second layer C.L from directly connecting to the ohmic contact layer 120. If the second layer C.L of copper contacts the ohmic contact layer 120 without the first layer T.L of titanium, the copper of the second layer C.L reacts with silicon (Si) of the ohmic contact layer 120 and to produce an interlayer between the second layer C.L and the ohmic contact layer 120. The interlayer deteriorates and degrades characteristics of the thin film transistor. Accordingly, the first layer T.L of titanium prevents the direct contact between the second layer C.L and the ohmic contact layer 120.

After forming the source and drain electrodes 126 and 128 having the double-layered metal patterns, a portion of the ohmic contact layer 120 exposed between the source and drain electrodes 126 and 128 is removed. Furthermore, a passivation layer 136 is formed over an entire surface of the substrate 100 to cover the source and drain electrodes 126 and 128, the data line 130, the data pad 132, and the plurality of pixel electrodes 134. The passivation layer 136 may be an organic material, for example, benzocyclobutene (BCB) or acrylic resin.

FIGS. 6E, 7E, 8E and 9E illustrate a fourth mask process of forming a gate pad contact hole 138 and a data pad contact hole 140. Portions of the gate insulating layer 116 and the passivation layer 136 over the gate pad 110 are simultaneously etched, and at the same time a portion of the passivation layer 136 over the data pad 132 is also etched. Thus, a gate pad contact hole 138 and a data pad contact hole 140 are formed, respectively, exposing a portion of the gate pad 110 and a portion of the data pad 132. Thereafter, the second layers C.L of the gate and data pads 110 and 132, which are exposed respectively by the gate pad and data pad contact holes 138 and 140, are removed to expose the underlying first layers T.L of the gate and data pads 110 and 132.

When forming the gate and data pad contact holes 138 and 140, the passivation layer 136 is removed by a dry etch, and some of the organic material may remain on the surface of the second layer C.L of the gate and data pads 110 and 132. Some of the residual of the organic material is not removed during a later-conducted washing process, and the residual increases the contact resistance of the gate and data pads 110 and 132 when the outer circuit is connected to the gate and data pads 110 and 132. Thus, the second layers C.L exposed by the gate and data pad contact holes 138 and 140 are removed to eliminate the organic residual of the passivation layer 136 from the gate and data pads 110 and 132. The second layers C.L of copper exposed by the gate and data pad contact holes 138 and 140 are etched by a wet etch using a mixed solution of hydrogen peroxide (H$_2$O$_2$) and acetic acid (CH$_3$COOH).

FIGS. 6F, 7F, 8F and 9F illustrate a fifth mask process of forming a gate pad terminal 142 and a data pad terminal 144. A transparent conductive material, for example, indium tin oxide (ITO) or indium zinc oxide (IZO), is formed over the passivation layer 136 having the gate pad and data pad contact holes 138 and 140. Then, the transparent conductive material is patterned using a fifth mask process to form the gate pad terminal 142 contacting the first layer T.L of the gate pad 110, and the data pad terminal 144 contacting the first layer T.L of the data pad 132. Accordingly, the array substrate for use in the IPS-LCD device is fabricated according to the first embodiment of the present invention.

Figure 10:
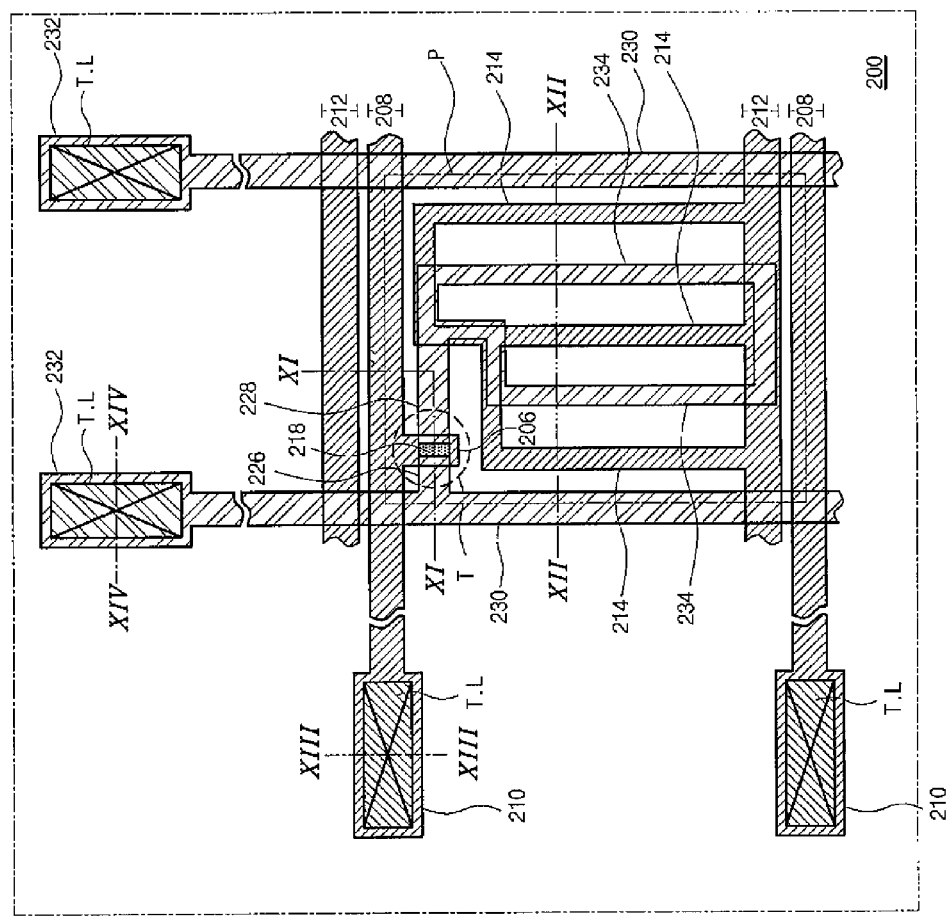
FIG. 10 is a plan view illustrating an array substrate for use in an IPS-LCD device according to a second embodiment of the present invention.
Figure 11A:
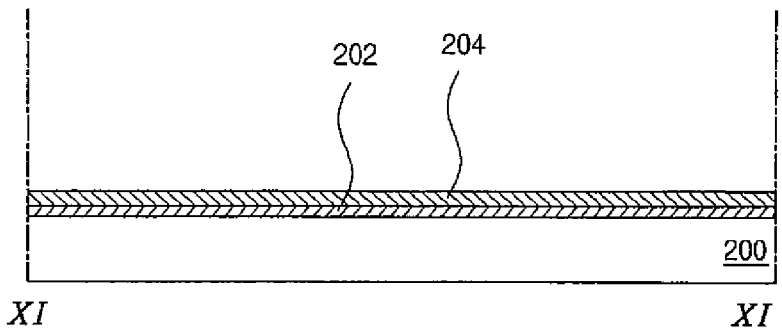
FIGS. 11A-11E, 12A-12E, 13A-13E and 14A-14E are cross sectional views taken along lines XI-XI, XII-XII, XIII-XIII and XIV-XIV of FIG. 10, respectively, and illustrate the process of forming the array substrate of FIG. 10.
Figure 11B:
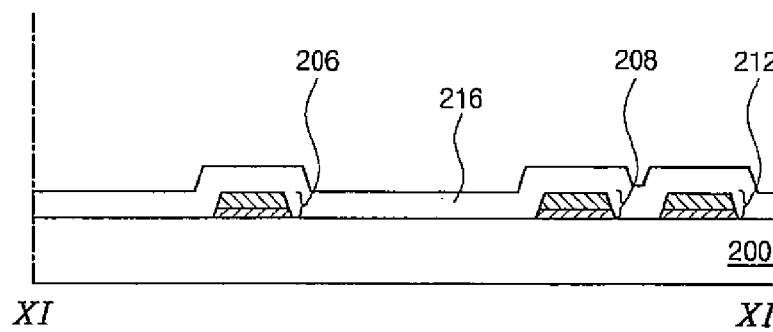
Figure 11C:
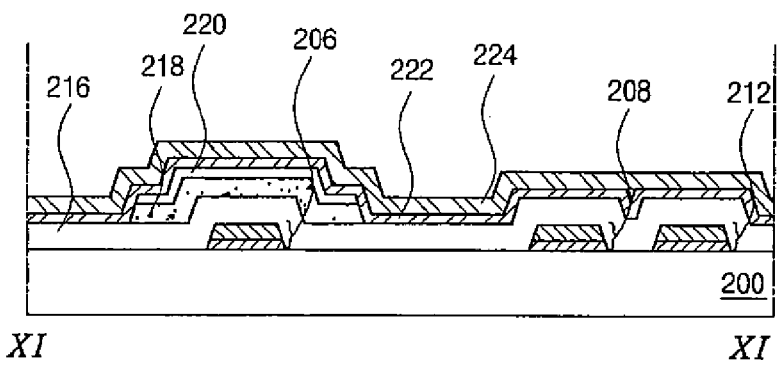
Figure 11D:
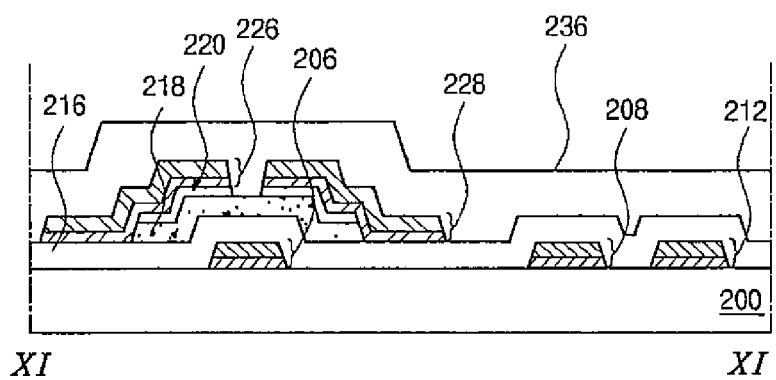
Figure 11E:
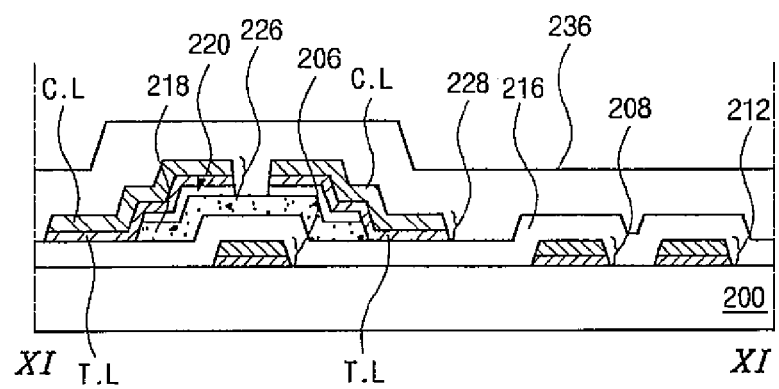
Figure 12A:
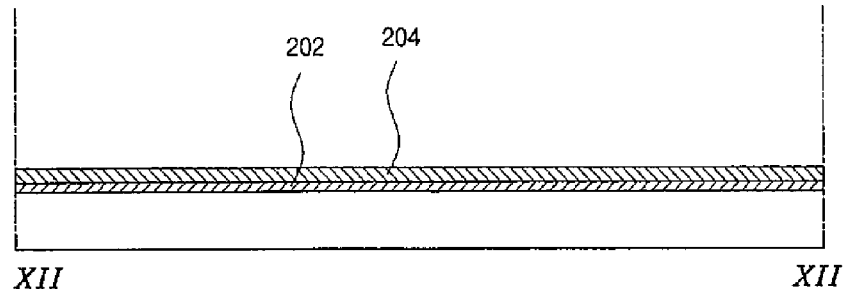
Figure 12B:
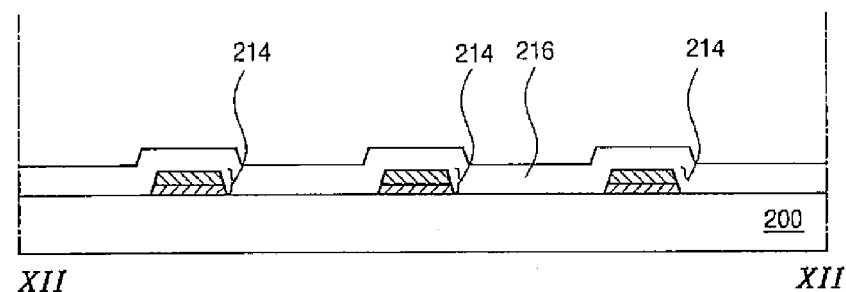
Figure 12C:
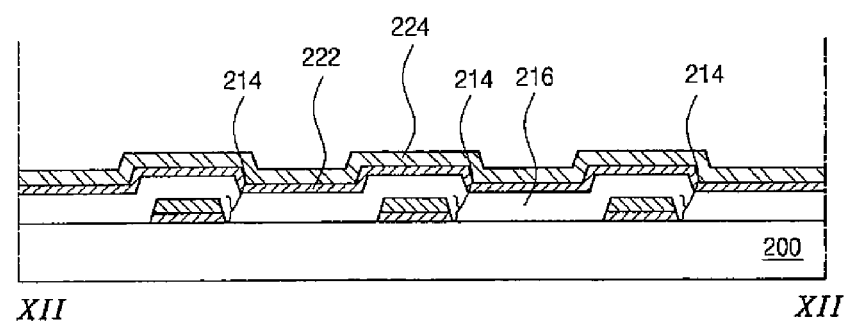
Figure 12D:
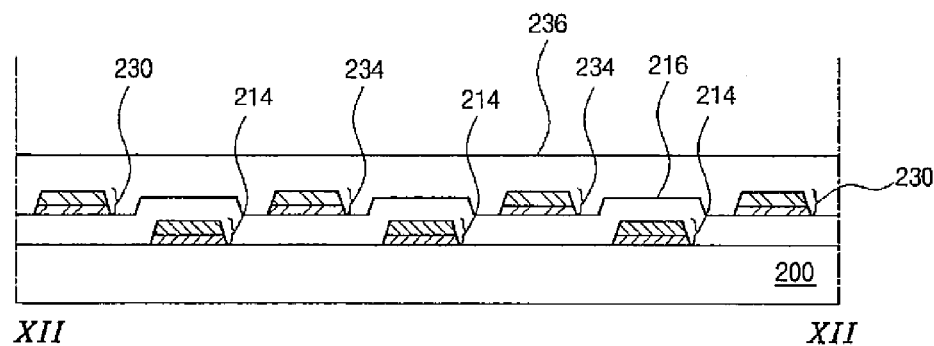
Figure 12E:
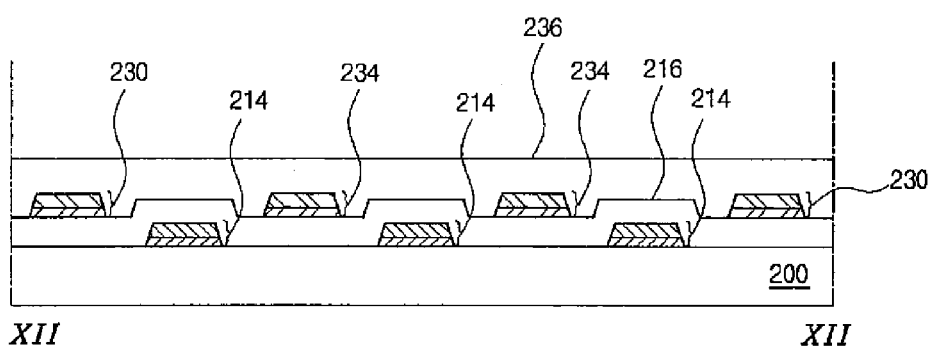
Figure 13A:
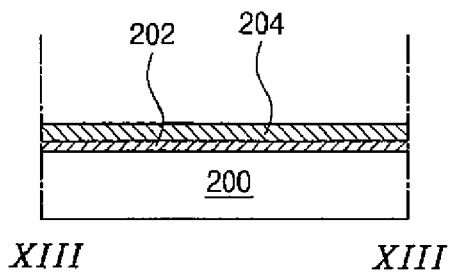
Figure 13B:
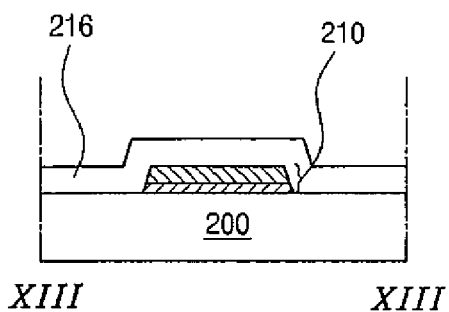
Figure 13C:
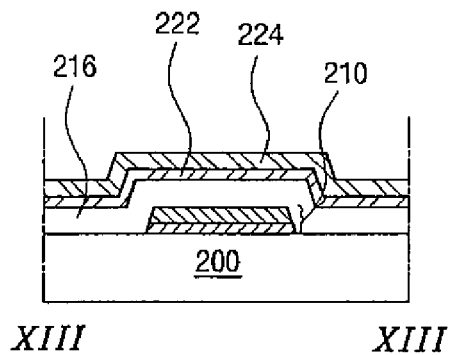
Figure 13D:
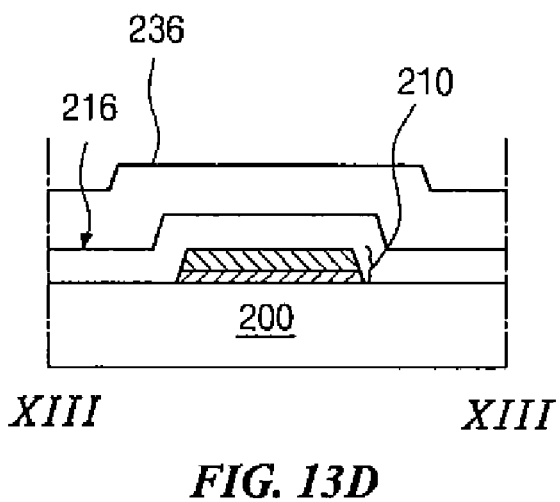
Figure 13E:
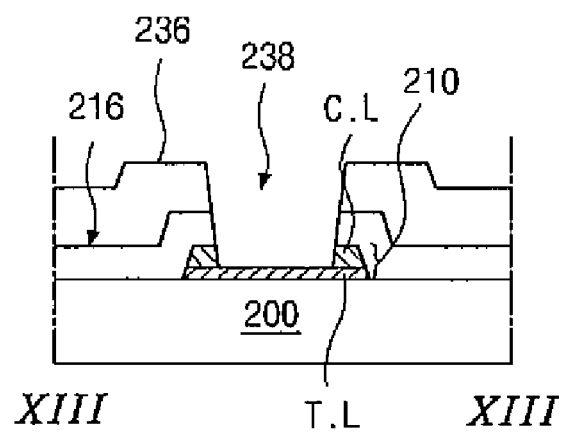
Figure 14A:
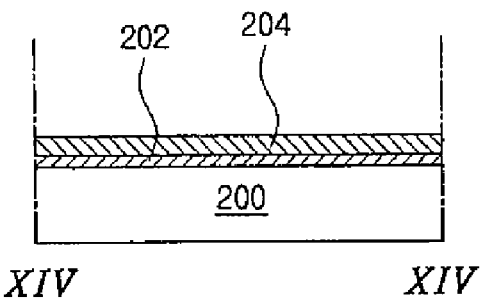
Figure 14B:
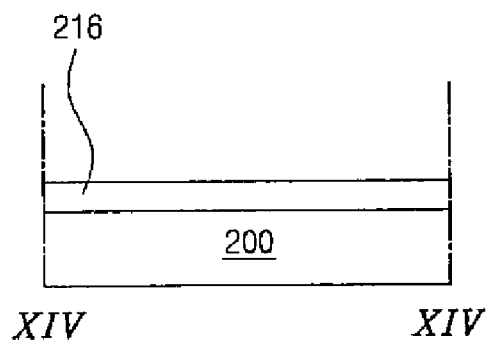
Figure 14C:
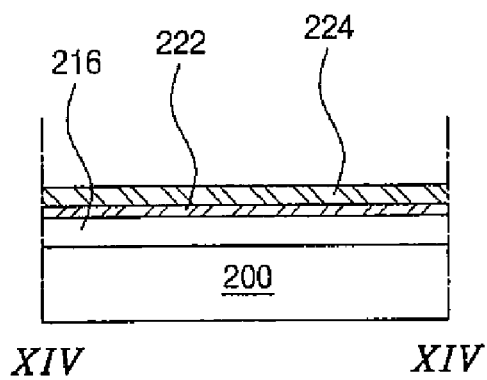
Figure 14D:
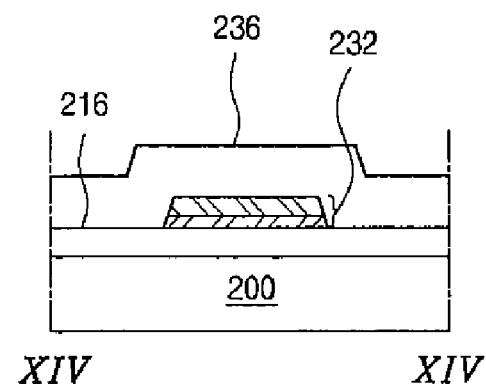
Figure 14E:
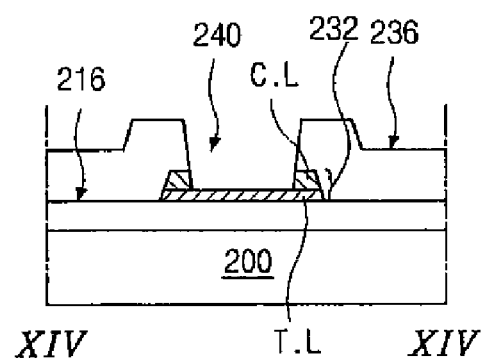

FIG. 10 is a plan view illustrating an array substrate for use in an IPS-LCD device according to a second embodiment of the present invention. Unlike the first embodiment, a four-mask process can fabricate the array substrate in the second embodiment.

As shown in FIG. 10, a plurality of gate lines 208 are disposed in a transverse direction and spaced apart from each other by a predetermined distance. A plurality of common lines 212 are also disposed substantially parallel to the gate lines 208, and each common line 212 is adjacent to each gate line 208. A plurality of data lines 230 are disposed in a longitudinal direction substantially perpendicular to the gate and data lines 208 and 212. Pairs of the gate and data lines 208 and 230 define a pixel region P. A gate pad 210 is disposed at one end of each gate line 208, and a data pad 232 is disposed at one end of each data line 230.

Near a crossing of the gate and data lines 208 and 230, there is provided a thin film transistor T including a gate electrode 206, an active layer 218, a source electrode 226, and a drain electrode 228. The gate electrode 206 extends from the gate line 208, whereas the source electrode 226 extends from the data line 230. The active layer 218 is disposed over the gate electrode 206, and the source and drain electrodes 226 and 228 are over the active layer 218.

A plurality of pixel electrodes 234 that are substantially parallel to the data lines 30 are located in the pixel region P. The plurality of pixel electrodes 234 are electrically connected to the drain electrode 228 of the thin film transistor T. A plurality of common electrodes 214 are also disposed within the pixel region P and substantially parallel to the data lines 230. The common electrodes 214 are substantially perpendicular and connected to the common line 212. The common electrodes 214 are arranged in an alternating pattern with the pixel electrodes 234.

In the second embodiment shown in FIG. 10, the gate electrode 206, the gate line 208, the source and drain electrodes 226 and 228, and the data line 230 have a double layered structure of titanium (Ti) and copper (Cu). Because copper (Cu) has a low electrical resistance, the signal delay may be prevented and the array substrate having those double-layered metal patterns can be used for the IPS-LCD panel having a large size.

Referring back to FIG. 10, the gate and data pads 210 and 232 also have a double-layered metal structure of Ti and Cu, and the underlying Ti layers T.L are exposed by removing overlying Cu layers, respectively. Thus, the external driving circuits may be connected to the exposed Ti layers T.L in the second embodiment of the present invention.

FIGS. 11A-11E, 12A-12E, 13A-13E and 14A-14E are cross sectional views taken along lines XI-XI, XII-XII, XIII-XIII and XIV-XIV of FIG. 10, respectively, and illustrates the process of forming the array substrate of FIG. 10. FIGS. 11A-11E illustrate the process of forming the thin film transistor, FIGS. 12A-12E illustrate the process of forming the pixel region, FIGS. 13A-13E illustrate the process of forming the gate pad, and FIGS. 14A-14E illustrate the process of forming the data pad.

In FIGS. 11A, 12A, 13A and 14A, titanium (Ti) and copper (Cu) are sequentially deposited on a substrate 200 to form a first Ti layer 202 and a first Cu layer 204 in series. The first Ti layer 202 may have a thickness of 150-200 angstroms (Å) or 1000 angstroms (Å), and the first Cu layer 204 may have a thickness of 1500-2000 angstroms (Å). The first Ti layer 202 functions as a barrier layer that helps the first Cu layer 204 to adhere to the substrate 200. Specifically, because the first Cu layer 204 does not have a good adherence to the substrate 200, the first Ti layer 202 compensates and increases the adherence between the substrate 200 and the first Cu layer 204.

In FIGS. 11B, 12B, 13B and 14B, the first Ti layer 202 and the first Cu layer 204 are simultaneously patterned using a first mask process, to form a gate electrode 206, a gate line 208 and a gate pad 210. Further at this time of patterning, a common line 212 and a plurality of common electrodes 214 are also formed. The gate and common lines 208 and 212 are disposed adjacent to and substantially parallel to each other. The gate electrode 206 extends from the gate line 208, and the gate pad 210 is disposed at one end of the gate line 208. The common electrodes 214 are substantially perpendicular to and extend from the common line 212 in a direction opposite to the adjacent gate line.

When patterning the double-layered metal layers of Ti and Cu, a mixed solution is used. The mixed solution includes hydrogen peroxide ($H_2O_2$), an etching agent, a solution having fluoride (F), and an additive for controlling an etch profile. The etching agent includes $SO_4$ components (i.e., 2 $KHSO_5$, $KHSO_4$, $K_2SO_4$), COOH components (i.e., acetic acid), or $PO_4$ components. The solution having fluoride (F) is hydrogen fluoride (HF) or ammonium fluoride ($NH_4F$), for example.

After patterning the Ti and Cu layers 202 and 204, a gate insulating layer 216 is formed over an entire surface of the substrate 200 to cover all first double-layered metal patterns, such as the gate electrode 206, the gate line 208, the gate pad 210, the common line 212, and the plurality of common electrodes 214. The gate insulating layer 216 is an inorganic material, for example, silicon nitride ($SiN_x$) or silicon oxide ($SiO_2$).

Next in FIGS. 11C, 12C, 13C and 14C, pure amorphous silicon (a-Si:H) and doped amorphous silicon (n+a-Si:H) are sequentially deposited on the gate insulating layer 216, and then patterned using a second mask. Thus, an active layer 218 and an ohmic contact layer 220 are formed in series on the gate insulating layer 216. The active and ohmic contact layers 218 and 220 are disposed over the gate electrode 206. Next, titanium (Ti) and copper (Cu) are sequentially deposited on the gate insulating layer 216 to cover the active and ohmic contact layers 218 and 220 to form a second Ti layer 222 and a second Cu layer 224.

In FIGS. 11D, 12D, 13D and 14D, the second Ti and Cu layers 222 and 224 are simultaneously patterned using a third mask to form second double-layered metal patterns, such as a source electrode 226, a drain electrode 228, a data line 230, a data pad 232, and a plurality of pixel electrodes 234. The data line 230 perpendicularly crosses the gate and common lines 208 and 212 and defines a pixel region P with the gate lines 208. The source electrode 226 extends from the data line 230 and contacts the ohmic contact layer 220. The drain electrode 228 is spaced apart from the source electrode 226 across the gate electrode 206, and also contacts the ohmic contact layer 220. The data pad 232 is disposed at one end of the data line 230. Each pixel electrode 234 is substantially parallel to the data line 230 and disposed between the common electrodes 214. The plurality of pixel electrodes 234 are electrically connected to the drain electrode 228.

As described in FIG. 6D, each of the source and drain electrodes 226 and 228 is consists of a first layer of titanium (Ti) and a second layer of copper (Cu). The first layer directly contacts the underlying ohmic contact layer 220 so that it prevents the second layer from directly connecting to the ohmic contact layer 220. If the second layer of copper contacts the ohmic contact layer 220 without the underlying first layer of titanium, the copper of the second layer reacts with silicon (Si) of the ohmic contact layer 220 and then produces an interlayer therebetween. The interlayer deteriorates and degrades characteristics of the thin film transistor. Accordingly, the first layer of titanium prevents the direct contact between the second layer of copper and the ohmic contact layer 220.

Still referring to FIG. 6D, after forming the source and drain electrodes 226 and 228 having the double-layered metal patterns, a portion of the ohmic contact layer 220 exposed between the source and drain electrodes 226 and 228 is removed.

Furthermore, a passivation layer 236 is formed over an entire surface of the substrate 200 to cover the source and drain electrodes 226 and 228, the data line 230, the data pad 232, and the plurality of pixel electrodes 234. The passivation layer 236 may be an organic material, for example, benzocyclobutene (BCB) or acrylic resin.

FIGS. 11E, 12E, 13E and 14E illustrate the process of using a fourth mask to form a gate pad contact hole 238 and a data pad contact hole 240. Portions of the gate insulating layer 216 and the passivation layer 236 over the gate pad 210 are simultaneously etched, and at the same time a portion of the passivation layer 236 over the data pad 232 is also etched. Thus, a gate pad contact hole 238 and a data pad contact hole 240 are formed, respectively, exposing a portion of the gate pad 210 and a portion of the data pad 232. Thereafter, the second layers C.L of the gate and data pads 210 and 232, which are exposed respectively by the gate pad and data pad contact holes 238 and 240, are removed to expose the underlying first layers T.L of the gate and data pads 210 and 232.

As previously described, when forming the gate and data pad contact holes 238 and 240, the passivation layer 236 is removed by a dry etch, and some of the organic material may remain on the surface of the second layer C.L of the gate and data pads 210 and 232. A residual of the organic material is not entirely removed during a later-conducted washing process. The residual increases the contact resistance of the gate and data pads 210 and 232 and may block the electrical connection when the outer circuit is connected to the gate and data pads 210 and 232. Thus, the second layers C.L exposed by the gate and data pad contact holes 238 and 240 are removed to eliminate the organic residual of the passivation layer 236 from the gate and data pads 210 and 232. The second layers C.L of copper exposed by the gate and data pad contact holes 238 and 240 are etched by a wet etch using a mixed solution of hydrogen peroxide ($H_2O_2$) and acetic acid ($CH_3COOH$).

Accordingly with respect to FIGS. 11A-11E, 12A-12E, 13A-13E and 14A-14E, the array substrate for use in the IPS-LCD device is fabricated using four-mask processes according to the second embodiment of the present invention.

Figure 15:
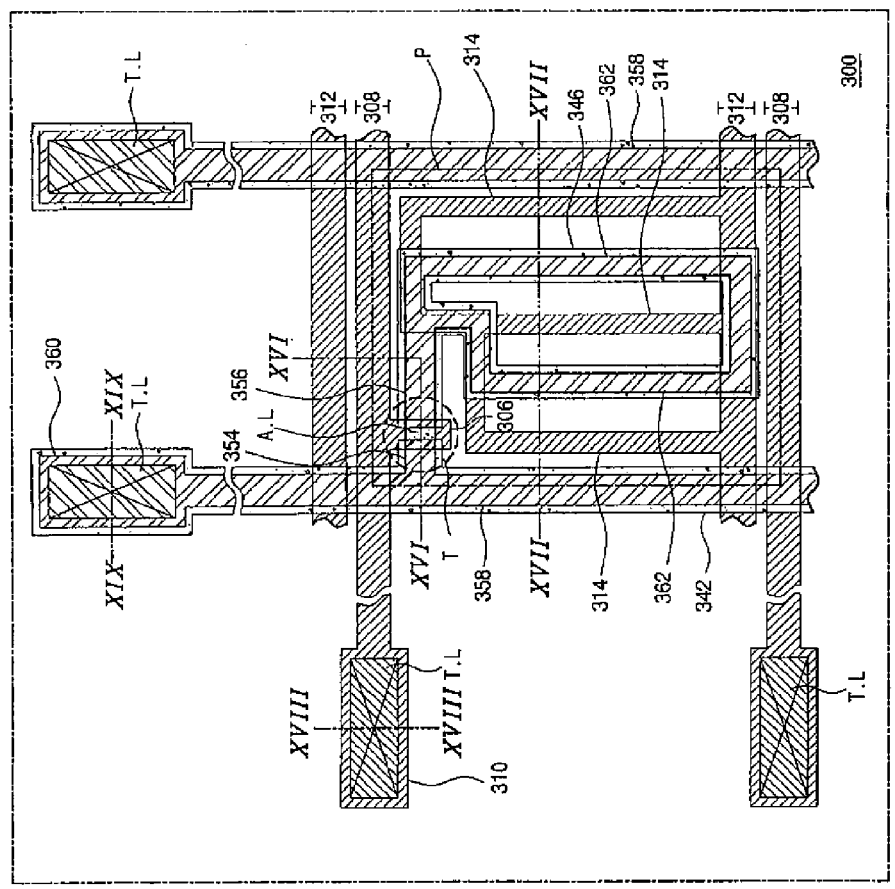
FIG. 15 is a plan view illustrating an array substrate for use in an IPS-LCD device according to a third embodiment of the present invention.
Figure 16A:
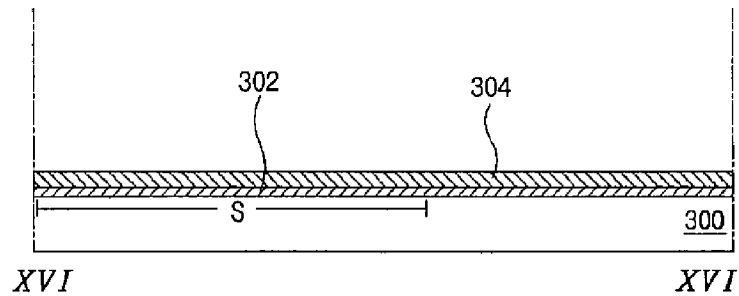
FIGS. 16A-16H, 17A-17H, 18A-18H and 19A-19H are cross sectional views taken along lines XVI-XVI, XVII-XVII, XVIII-XVIII and XIX-XIX of FIG. 15, respectively, and illustrate the process of forming the array substrate of FIG. 15.
Figure 16B:
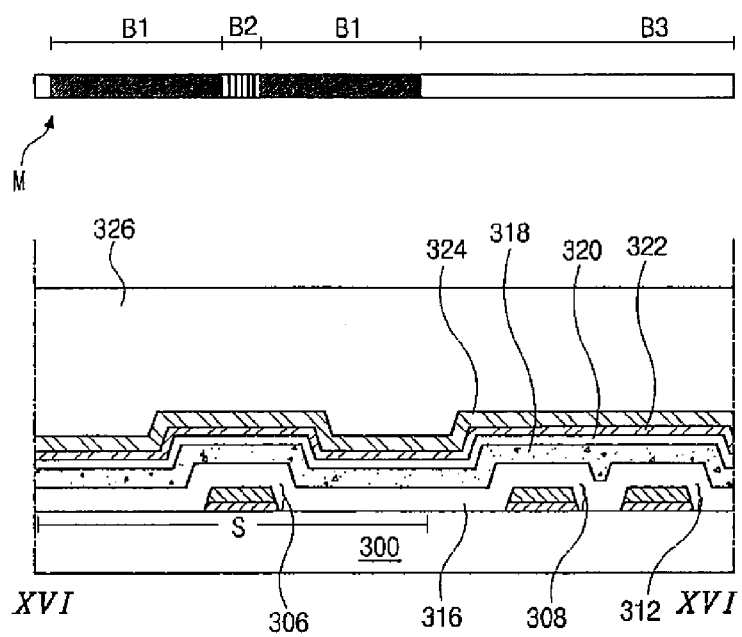
Figure 16C:
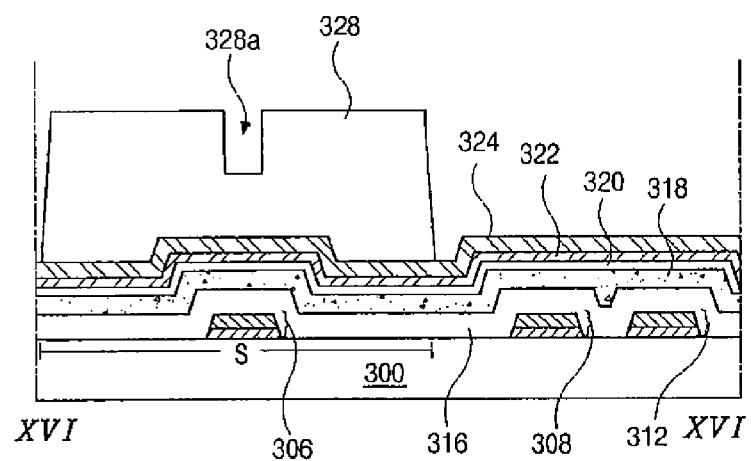
Figure 16D:
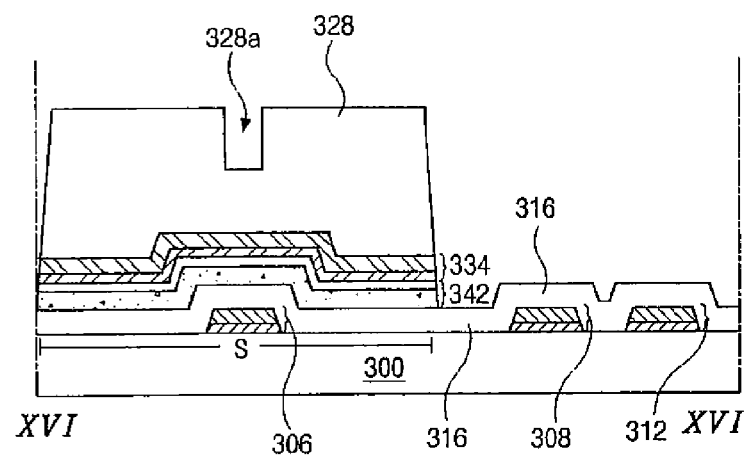
Figure 16E:
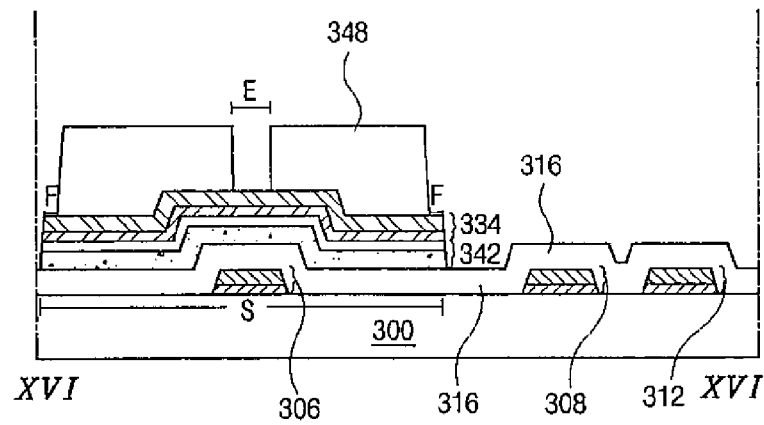
Figure 16F:
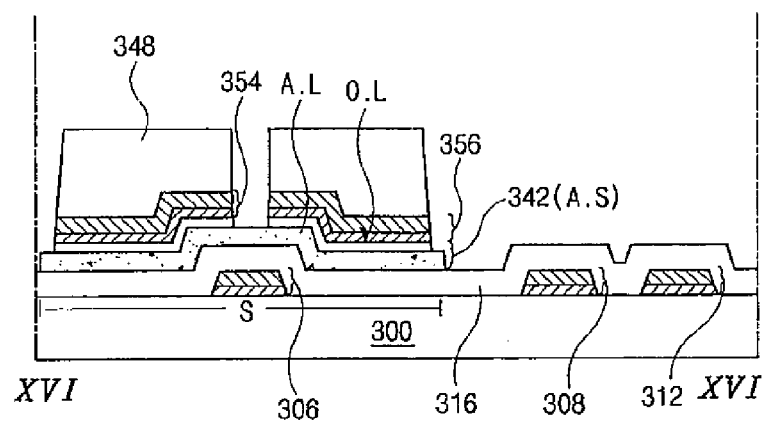
Figure 16G:
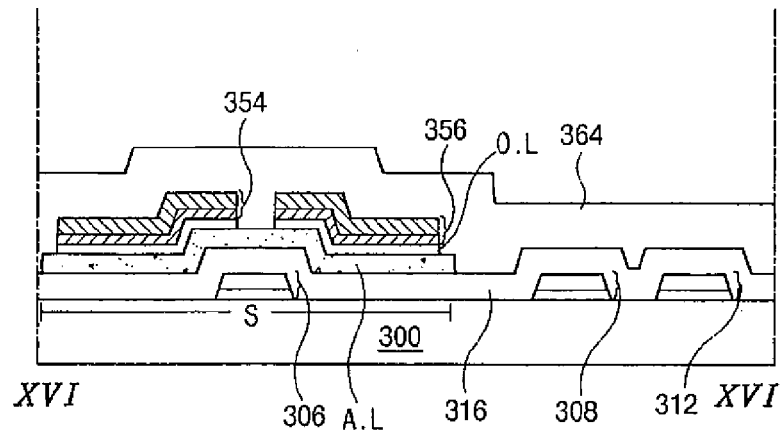
Figure 16H:
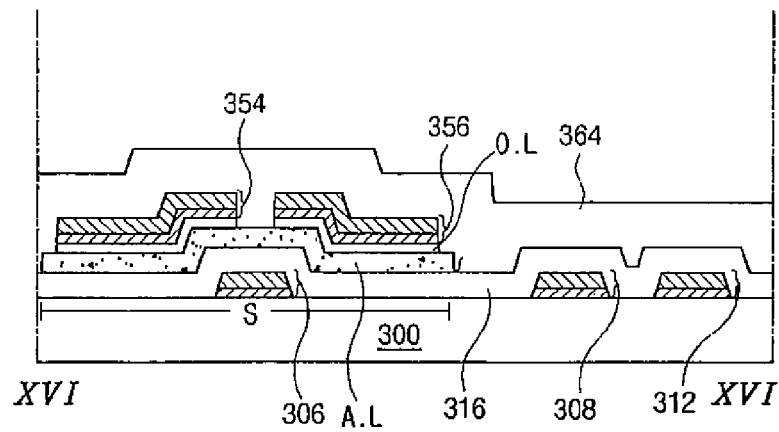
Figure 17A:
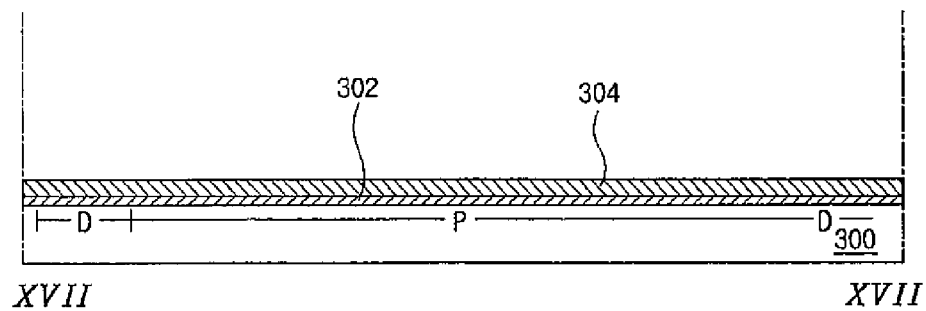
Figure 17B:
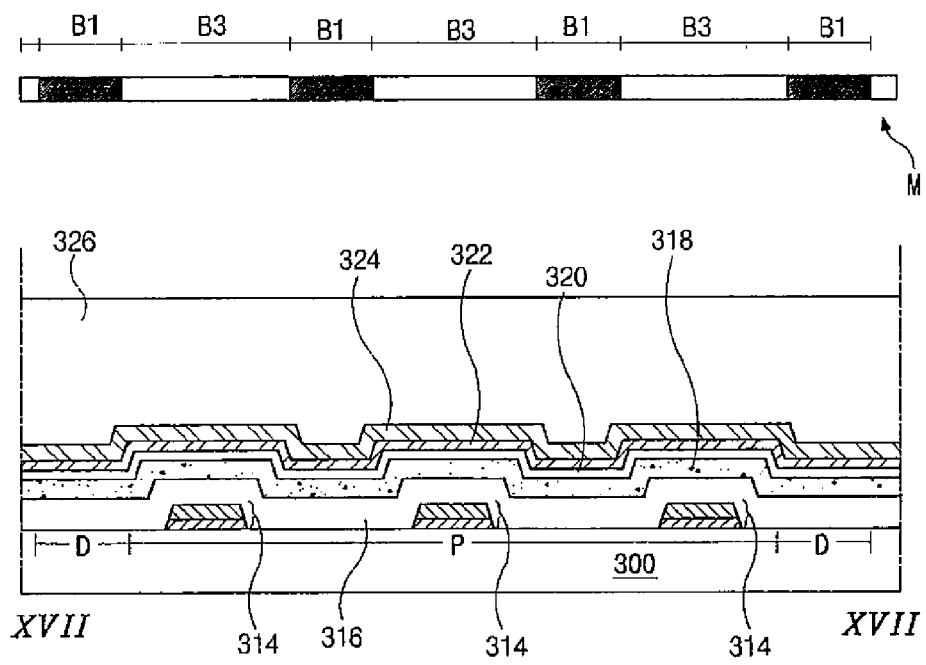
Figure 17C:
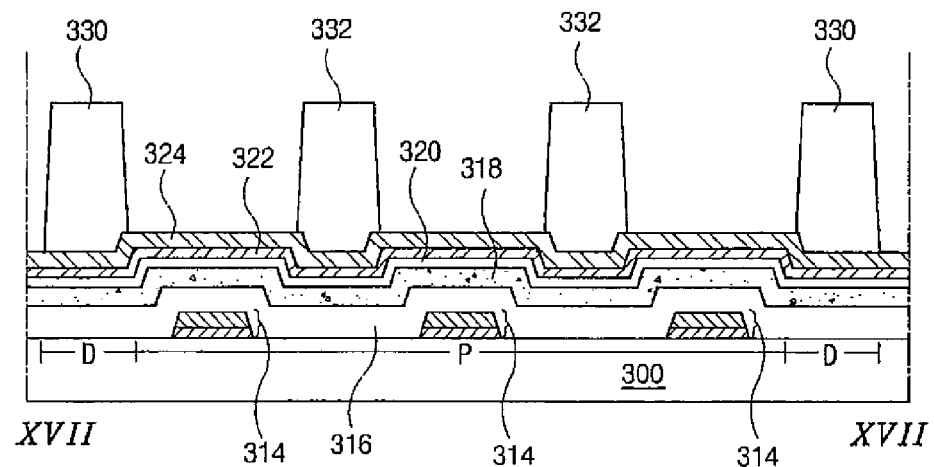
Figure 17D:
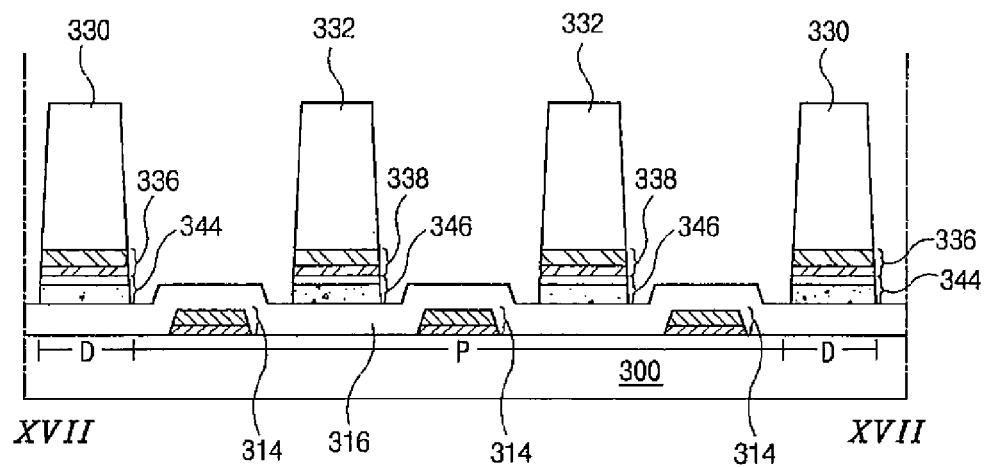
Figure 17E:
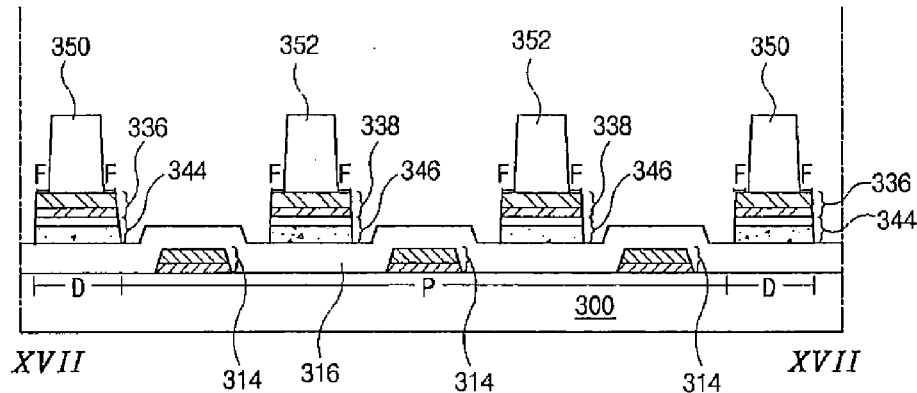
Figure 17F:
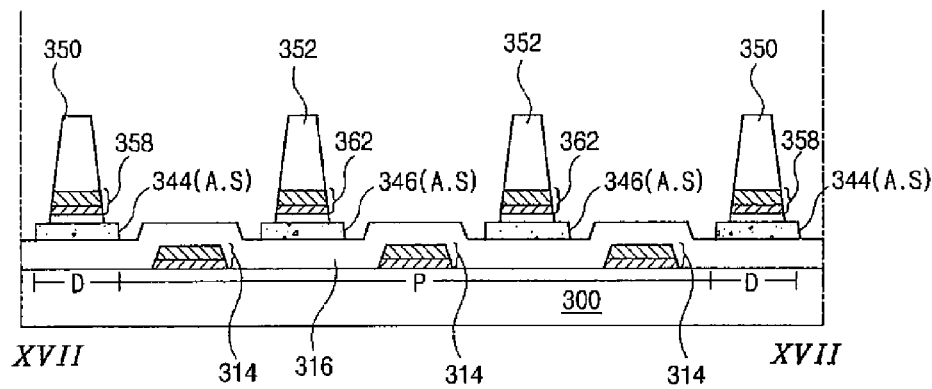
Figure 17G:
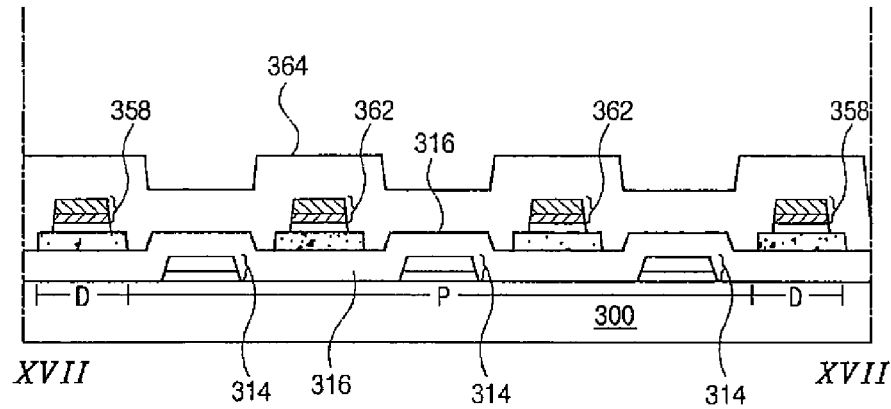
Figure 17H:
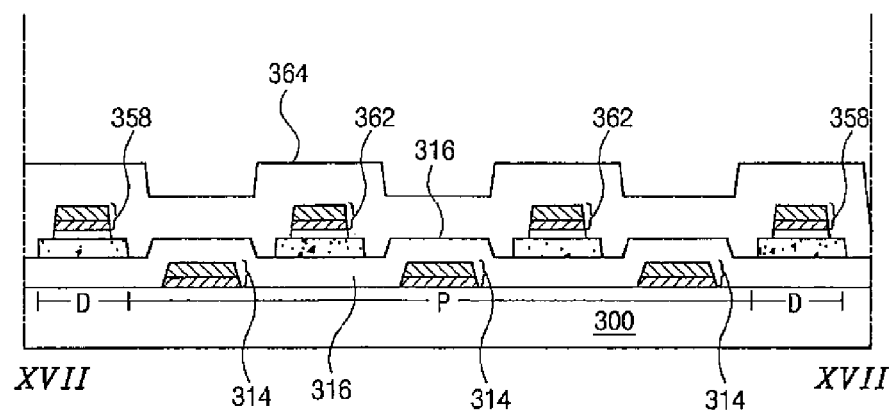
Figure 18A:
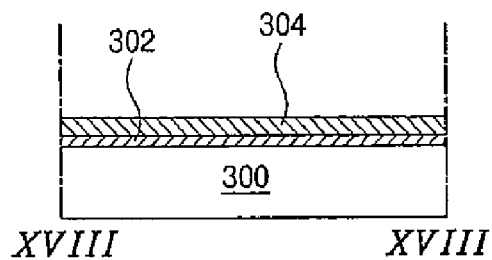
Figure 18B:
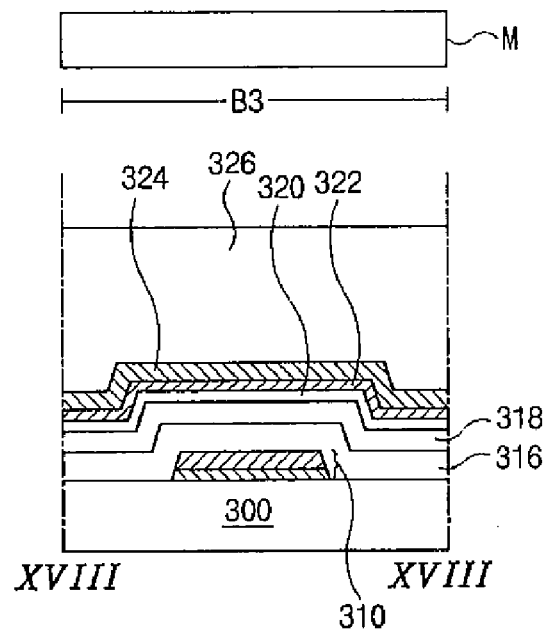
Figure 18C:
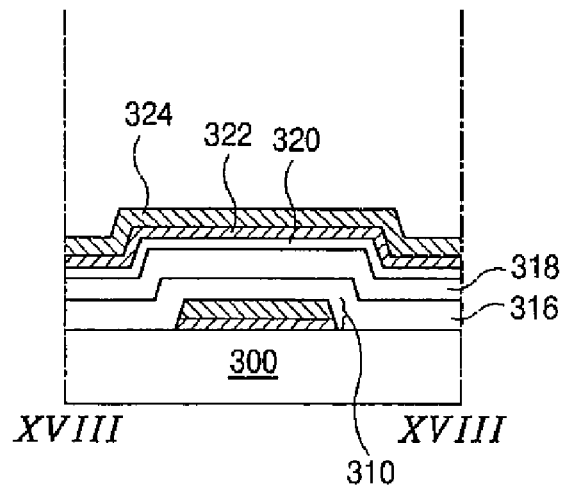
Figure 18D:
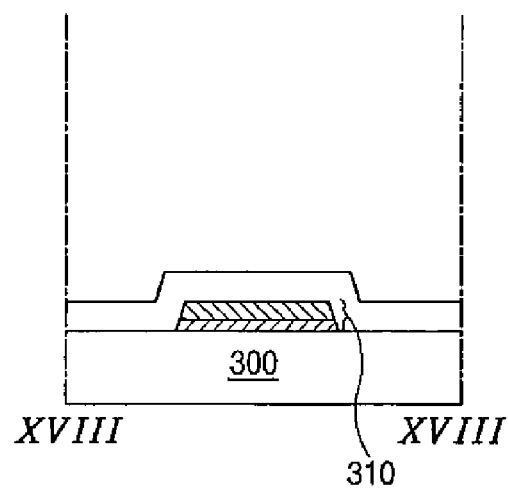
Figure 18E:
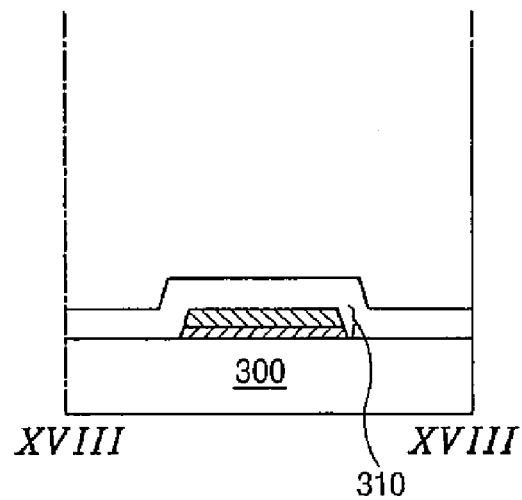
Figure 18F:
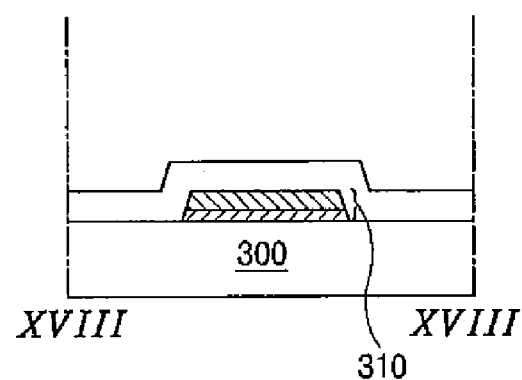
Figure 18G:
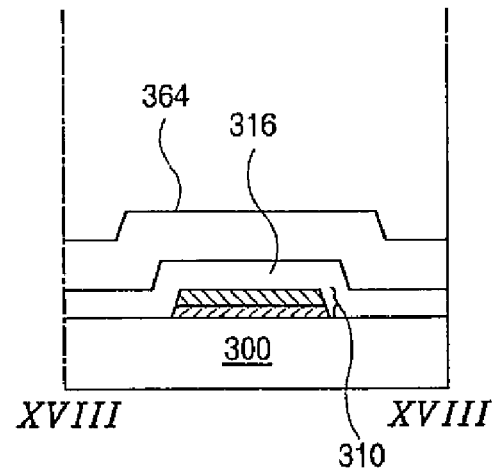
Figure 18H:
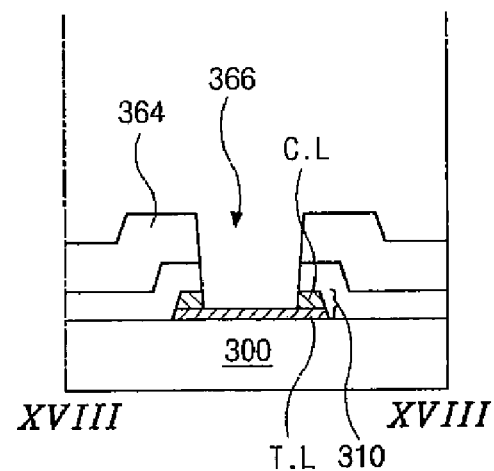
Figure 19A:
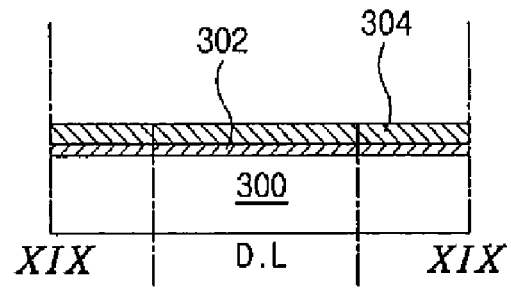
Figure 19B:
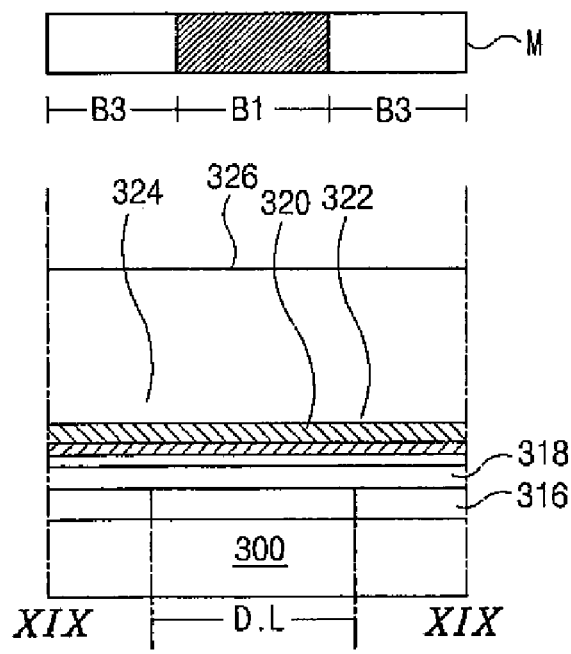
Figure 19C:
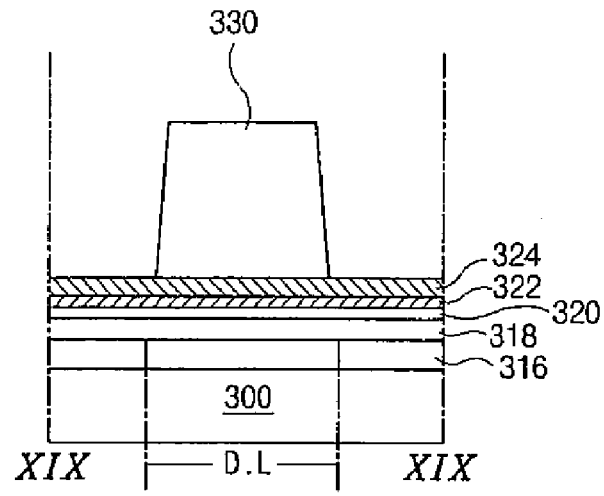
Figure 19D:
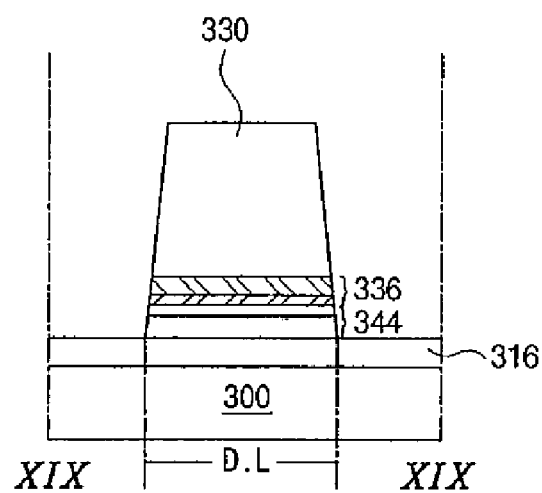
Figure 19E:
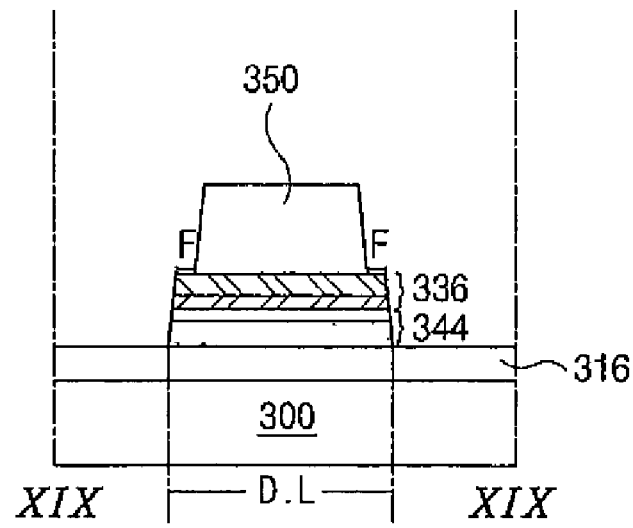
Figure 19F:
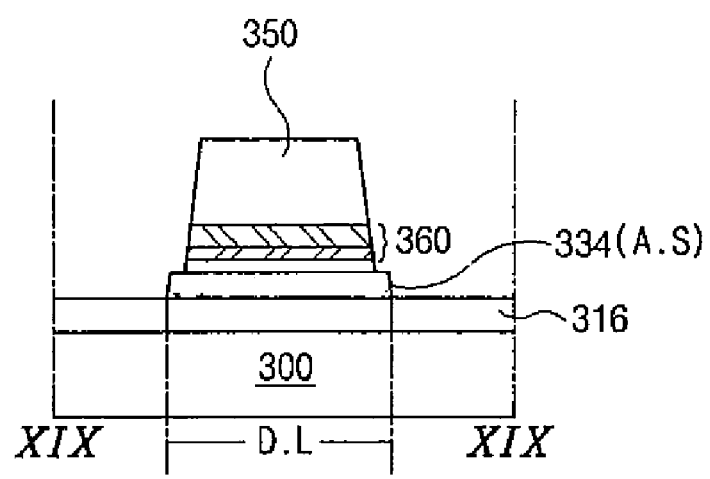
Figure 19G:
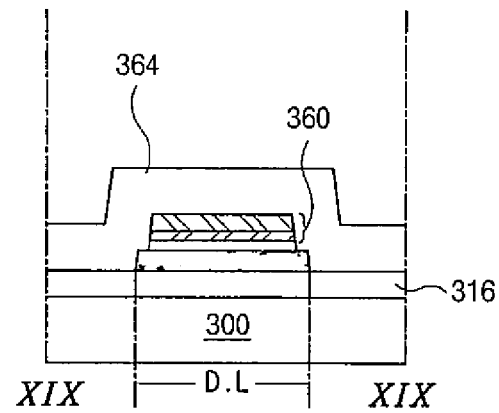
Figure 19H:
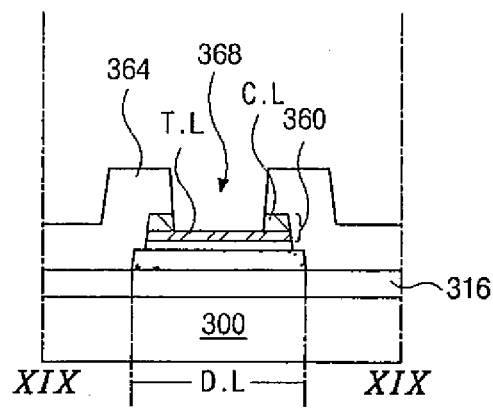

FIG. 15 is a plan view illustrating an array substrate for use in an IPS-LCD device according to a third embodiment of the present invention. In this third embodiment, the array substrate not only includes double-layered metal patterns, but also is fabricated using a three-mask process.

As shown in FIG. 15, a plurality of gate lines 308 are disposed in a transverse direction and spaced apart from each other by a predetermined distance. A plurality of common lines 312 are also disposed substantially parallel to the gate lines 308, and each common line 312 is adjacent to each gate line 308. A plurality of data lines 358 are disposed in a longitudinal direction substantially perpendicular to the gate and data lines 308 and 312. Pairs of the gate and data lines 308 and 358 define a pixel region P. A gate pad 310 is disposed at one end of each gate line 308, and a data pad 360 is disposed at one end of each data line 358.

Near a crossing of the gate and data lines 308 and 358, there is provided a thin film transistor T including a gate electrode 306, an active layer A.L, a source electrode 354, and a drain electrode 356. The gate electrode 306 extends from the gate line 308, whereas the source electrode 354 extends from the data line 358. The active layer A.L is disposed over the gate electrode 306, and the source and drain electrodes 354 and 356 are over the active layer A.L.

A plurality of pixel electrodes 362 substantially parallel to the data lines 358 are located in the pixel region P. The plurality of pixel electrodes 362 are electrically connected to the drain electrode 356 of the thin film transistor T. A plurality of common electrodes 314 are also disposed within the pixel region P and substantially parallel to the data lines 358. The common electrodes 314 are substantially perpendicular to and connected to the common line 312. The common electrodes 314 are arranged in an alternating pattern with the pixel electrodes 362.

In the third embodiment illustrated in FIG. 15, the gate electrode 306, the gate line 308, the common line 312 and electrodes 314, the source and drain electrodes 354 and 356, the data line 358, and the pixel electrode 362 each a double layered structure of titanium (Ti) and copper (Cu). Because copper (Cu) has a low electrical resistance, a signal delay may be prevented and the array substrate having those double-layered metal patterns can be used for the IPS-LCD panel having a large size.

In FIG. 15, the gate and data pads 310 and 360 also have a double-layered metal structure of Ti and Cu, and the underlying Ti layers T.L are exposed by way of removing overlying Cu layers, respectively. Thus, the external driving circuits may be connected to the exposed Ti layers T.L in the gate and data pads 310 and 360 of the third embodiment of the present invention.

Furthermore, the double-layered metal patterns, such as the source and drain electrodes 354 and 356, the data line 358, the data pad 360 and the pixel electrodes 362, are formed with the active layer A.L. Thus, semiconductor layers 342 and 346 are formed underneath the double-layered patterns. Such semiconductor layers 342 function to increase the adhesion of the overlying double-layered metal patterns of the source and drain electrodes 354 and 356, the data line 358, the data pad 360 and the pixel electrodes 362.

FIGS. 16A-16H, 17A-17H, 18A-18H and 19A-19H are cross sectional views taken along lines XVI-XVI, XVII-XVII, XVIII-XVIII and XIX-XIX of FIG. 15, respectively, and illustrate a process of forming the array substrate of FIG. 15. FIGS. 16A-16H show the process of forming the thin film transistor, FIGS. 17A-17H show the process of forming the pixel region, FIGS. 18A-18H show the process of forming the gate pad, and FIGS. 19A-19H show the process of forming the data pad.

In FIGS. 16A, 17A, 18A and 19A, a pixel region P, a switching region S, data regions D, and a data pad region D.L are defined on a substrate 300. The pixel region P is an area where the pixel electrode is formed, and the switching region S is an area where the thin film transistor is defined and disposed at one corner of the pixel region P. The data regions D are areas where the data lines are formed and are disposed at both sides of the pixel region P. The data pad region D.L is an area where the data pad is formed.

Titanium (Ti) and copper (Cu) are sequentially deposited on an entire surface of the substrate 300 to form a first Ti layer 302 and a first Cu layer 304 in series on the substrate 300. The first Ti layer 302 may have a thickness of about 100-200 angstroms (Å), and the first Cu layer 304 may have a thickness of about 1500-2000 angstroms (Å). The first Ti layer 302 functions as a barrier layer that helps the first Cu layer 304 to strongly adhere to the substrate 300. Specifically, because the first Cu layer 304 does not have good adhesion to the substrate 300, the first Ti layer 302 compensates and increases the adhesion between the substrate 300 and the first Cu layer 304.

In FIGS. 16B, 17B, 18B and 19B, the first Ti layer 302 and the first Cu layer 304 are simultaneously patterned using a first mask process to form first double-layered metal patterns, such as a gate electrode 306, a gate line 308 and a gate pad 310. Further at this time of patterning, a common line 312 and a plurality of common electrodes 314 are also formed in the pixel region P. The common line and common electrodes 312 and 314, respectively, also have the double-layered metal structure. The gate and common lines 308 and 312 are disposed adjacent to and substantially parallel to each other. The gate electrode 306 extends from the gate line 308, and the gate pad 310 is disposed at one end of the gate line 308. The common electrodes 314 perpendicularly extend from the common line 312 in a direction opposite to the adjacent gate line.

After patterning the Ti and Cu layers 302 and 304, a gate insulating layer 316 is formed over an entire surface of the substrate 300 to cover all first double-layered metal patterns, such as the gate electrode 306, the gate line 308, the gate pad 310, the common line 312, and the plurality of common electrodes 314. The gate insulating layer 316 is an inorganic material, for example, silicon nitride ($SiN_x$) or silicon oxide ($SiO_2$). Thereafter, a pure amorphous silicon (a-Si:H) layer 318, a doped amorphous silicon (n+a-Si:H) 320, a second Ti layer 322, and a second Cu layer 324 are sequentially deposited on the gate insulating layer 316. Then, a photoresist layer 326 is formed on the second Cu layer 324.

After forming the photoresist layer 326, a second mask process is conducted. A mask M having first to third portions B1-B3 is disposed over the photoresist layer 326. Light irradiates through the mask M to partially expose the photoresist layer 326. The first portions B1 are light-shielding areas that completely block the light, the second portion B2 is a half transmitting area that permits half the light to pass, and the third portions B3 are light-transmitting area where the light thoroughly passes. The first portions B1 correspond to the areas where the second double-layered metal patterns are formed, and the second portion B2 corresponds to the area where a channel is formed over the gate electrode 306.

In FIGS. 16C, 17C, 18C and 19C, after the light exposure process using the mask M, the photoresist layer 326 is developed to form first to third photoresist patterns 328, 330 and 332. The first photoresist pattern 328 corresponds in position to the switching region S, and the second photoresist patterns 330 correspond in position to the data region D and the data pad region D.L. The third photoresist patterns 332 are disposed within the pixel region P in positions between the common electrodes 314. The first photoresist pattern 328 has an indented portion 328a that corresponds to the second portion B2 of the mask. Because half of the light irradiates through the second portion B2 during the light exposure process, the indented portion 328a has a height half the other portion of the first photoresist pattern 328.

In FIGS. 16D, 17D, 18D and 19D, the pure amorphous silicon layer 318, the doped amorphous silicon layer 320, the second Ti layer 322 and the second Cu layer 324 are simultaneously patterned. Specifically, the portions of the second Ti and Cu layers 322 and 324 exposed by the first to third photoresist patterns 328, 330 and 332 are simultaneously removed using an etching solution, i.e., the wet etching, and the pure and doped amorphous silicon layer 318 and 320 are etched using a dry etch method. Therefore, first to third metal patterns 334, 336 and 338 each comprised of Ti—Cu double layers are formed underneath the first to third photoresist patterns 328, 330 and 332, respectively. Furthermore, first to third silicon patterns 342, 344 and 346 each comprising a first layer of pure amorphous silicon and a second layer of doped amorphous silicon are formed underneath the first to third metal patterns 334, 336 and 338, respectively.

As described hereinbefore, when patterning the second Ti and Cu layers 322 and 324, a mixed etching solution is used. The mixed solution includes hydrogen peroxide ($H_2O_2$), an etching agent, a solution having fluoride (F), and an additive for controlling an etch profile. The etching agent includes $SO_4$ components (i.e., $2\ KHSO_5$, $KHSO_4$, $K_2SO_4$), COOH components (i.e., acetic acid), or $PO_4$ components. The solution having fluoride (F) is hydrogen fluoride (HF) or ammonium fluoride ($NH_4F$), for example.

FIGS. 16E, 17E, 18E and 19E illustrate a process of ashing the first to third photoresist patterns 328, 330 and 332. The ashing process is conducted until the indented portion 328a of the first photoresist pattern 328 is completely removed to expose an underlying portion E of the first metal pattern 334 corresponding to the gate electrode 306 to form first to third ashed photoresist patterns 348, 350 and 352. After the ashing process, peripheral portions F of the first to third metal patterns 334, 336 and 338 are exposed because the peripheral portions of photoresist patterns are also removed during the ashing process.

In FIGS. 16F, 17F, 18F and 19F, the exposed peripheral portions F of the first to third metal patterns 334, 336 and 338 are removed to form a source electrode 354, a drain electrode 356, data lines 358, a data pad 360 and a plurality of pixel electrodes 362. Furthermore, the exposed portion E of the first metal pattern 334 is also removed. After that, portions of the doped amorphous silicon layers, which are exposed by the removal of the exposed portions E and F of the metal patterns 334, 336 and 338, are also removed so that the underlying pure amorphous silicon layers 342(A.S), 344(A.S) and 346 (A.S) are exposed in peripheries. Further, the first pure amorphous silicon layer 342(A.S) becomes an active layer A.L and has a channel between the source and drain electrodes 354 and 356. The doped amorphous silicon layer on the active layer 342(A.S) becomes an ohmic contact layer O.L.

Accordingly, the second mask process is complete as described with reference to FIGS. 16B-16F, 17B-17F, 18B-18F and 19B-19F.

In FIGS. 16G, 17G, 18G and 19G, all of the first to third ashed photoresist patterns 348, 350 and 352 are completely eliminated from the underlying metal patterns. Thereafter, a passivation layer 364 is formed over an entire surface of the substrate 300 to cover the source and drain electrodes 354 and 356, the data line 358, the data pad 360, and the plurality of pixel electrodes 362. The passivation layer 364 may be an organic material, for example, benzocyclobutene (BCB) or acrylic resin.

FIGS. 16H, 17H, 18H and 19H illustrate a process of a third mask of forming a gate pad contact hole 366 and a data pad contact hole 368. Portions of the gate insulating layer 316 and the passivation layer 364 over the gate pad 310 are simultaneously etched, and at the same time a portion of the passivation layer 364 over the data pad 360 is also etched. Thus, the gate pad contact hole 366 and a data pad contact hole 368 are formed, respectively, exposing a portion of the gate pad 310 and a portion of the data pad 360. Thereafter, second layers C.L of the gate and data pads 310 and 360, which are exposed respectively by the gate pad and data pad contact holes 366 and 368, are removed to expose underlying first layers T.L of the gate and data pads 310 and 360.

As previously described, when forming the gate and data pad contact holes 366 and 368, the passivation layer 364 are removed by a dry etch, and some of the organic material of the passivation layer 364 may remain on the surface of the second layer C.L of the gate and data pads 310 and 360. The residuals of the organic material are not completely removed during a later-conducted washing process. The residuals increase the contact resistance of the gate and data pads 310 and 360 and may block the electrical connection when the outer circuit is connected to the gate and data pads 310 and 360. Thus, the second layers C.L exposed by the gate and data pad contact holes 366 and 368 are removed to eliminate the organic residuals of the passivation layer 326 from the gate and data pads 310 and 360. The second layers C.L of copper exposed by the gate and data pad contact holes 366 and 368 are etched by a wet etch process using a mixed solution of hydrogen peroxide ($H_2O_2$) and acetic acid ($CH_3COOH$).

Accordingly, with respect to FIGS. 16A-1614, 17A-17H, 18A-18H and 19A-19H, the array substrate for use in the IPS-LCD device is fabricated using a three-mask processes according to the third embodiment of the present invention. In particular, the first mask process forms the gate line, the gate pad, the gate electrode, the common line and the common electrodes, and the second mask process forms the active layer, the source and drain electrodes, the data line, the data pad, and the pixel electrodes. Finally, the third mask process forms the gate and data pad contact holes that expose the gate and data pads.

In the second and third embodiments, the final mask processes etch the passivation layer and the gate insulating layer to expose the gate and data pads. However, if the gate and data pads are exposed without the mask process, the array substrates of the second and third embodiments will be fabricated using the three- and two-mask processes, respectively. The pad exposing process, which does not use a mask, will be explained in detail with reference to FIGS. 20 and 21.

Figure 20:
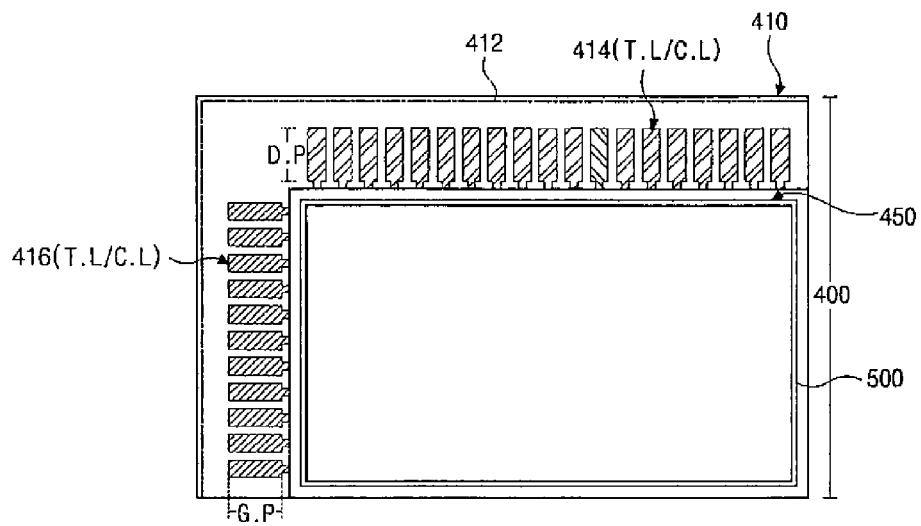
FIGS. 20 and 21 are schematic plan views of an IPS-LCD panel and illustrate the process according to a fourth embodiment of the present invention.
Figure 21:
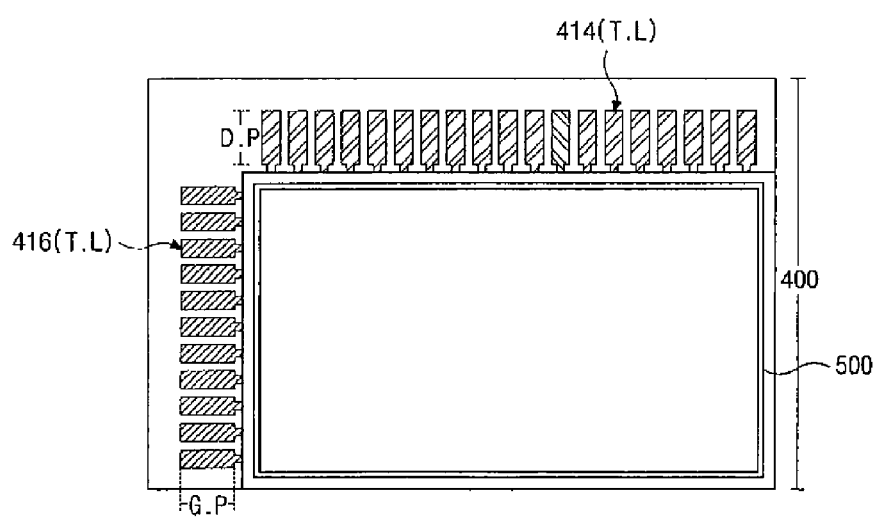

FIGS. 20 and 21 are schematic plan views of an IPS-LCD panel and illustrate a fourth embodiment of the present invention.

FIG. 20 shows the IPS-LCD panel after the third mask process of the second embodiment or after the second mask process of the third embodiment. FIG. 21 is a schematic plan view after exposing the gate and data pads according to the fourth embodiment of the present invention.

As shown in FIG. 20, the IPS-LCD panel 400 includes a first substrate 410 and a second substrate 450 with a liquid crystal layer (not shown) interposed therebetween. The first substrate 410 is the array substrate including the double-layered metal patterns. The first substrate 410 is fabricated using the mask processes described above without a final mask process of forming the pad contact holes. The second substrate 450 is a color filter substrate in which a plurality of color filters are disposed. The first and second substrates 410 and 450 are aligned and attached to each other by a sealant 500. After attaching, the peripheral portions of the second substrate 450 are cut and cropped to expose a gate pad portion G.P and a data pad portion D.P of the lower substrate 410. A plurality of gate pads 416 having a first layer T.L of titanium and a second layer C.L of copper are located in the gate pad portion G.P, and a plurality of data pads 414 having a first layer T.L of titanium and a second layer C.L of copper are located in the data pad portion D.P. The lower substrate 410 still includes a passivation layer over the gate and data pad portions G.P and D.P that covers the gate and data pads 416 and 414.

In FIG. 21, the passivation layer in the gate and data portions G.P. and D.P is removed to expose the gate and data pads 416 and 414. Thereafter, the copper layer C.L of each of the gate and data pads 416 and 414 is removed using a wet etch method to expose the underlying Ti layer T.L. Accordingly, the array substrate can be fabricated using the three-mask process or the two-mask process.

The present invention has the following advantages. First, because a metallic material having a low electrical resistance, for example, copper (Cu), is used for the array lines, the array substrate can be employed in the large IPS-LCD device requiring a high resolution.

Second, because the copper layers of the Ti/Cu double-layered gate and data pads are removed, the residuals of organic material remaining on the copper layer during the patterning process of the organic passivation layer can be completely removed. Thus, a signal interruption or blocking caused in the gate and data pads can be prevented. Tantatum (Ta) or Tungsten (W) may be used in place of the Ti layer, and silver (Ag) or platinum (Pt) may be used in place of the Cu layer.

Third, because the array substrate can be fabricated using a four-, three- or two-mask process, it is possible to decrease and simplify the process steps. Therefore, the fabrication time and the production cost will be reduced.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method of forming an array substrate for use in an in-plane switching liquid crystal display device, comprising:
providing first and second substrates;
sequentially forming a first barrier layer and a first low resistance metallic layer on the first substrate;
simultaneously patterning the first barrier layer and the first low resistance metallic layer using a first mask process to form a gate line, a gate electrode, a gate pad and a plurality of common electrodes on the first substrate, wherein the gate line is disposed in a first direction, the gate pad is connected to one end of the gate line, the gate electrode extends from the gate line, and the plurality of common electrodes are disposed in a second direction perpendicular to an adjacent gate line, and wherein the gate electrode and the gate line have a first double-layered structure consisting of the first barrier layer and the first low resistance metallic layer; forming a gate insulating layer over the first substrate to cover the gate line, the gate electrode, the gate pad and the plurality of common electrodes;
forming an active layer and an ohmic contact layer on the gate insulating layer using a second mask, the active layer and the ohmic contact layer disposed over the gate electrode; sequentially forming a second barrier layer and a second low resistance metallic layer on the gate insulating layer to cover the active and ohmic contact layers;
simultaneously patterning the second barrier layer and the second low resistance metallic layer using a third mask to form a data line in the second direction, a data pad at one end of the data line, a source electrode extending from the data line, a drain electrode spaced apart from the source electrode across the gate electrode, and a plurality of pixel electrodes in the second direction and connected to the drain electrode, wherein the pixel electrodes are arranged in an alternating pattern with the common electrodes, wherein the data line defines a pixel region with the gate line, and the data line and the source and drain electrodes have a second double-layered structure consisting of the second barrier layer and the second low resistance metallic layer; forming a passivation layer over the gate insulating layer to cover the data line, the data pad, the source electrode, the drain electrode, and the plurality of pixel electrodes;
attaching the second substrate to the first substrate using a sealant;
cropping peripheral portions of the second substrate to expose gate and data portions; and
etching a portion of the passivation layer corresponding to the gate and data portions to expose the gate and data pads.

2. The method according to claim 1, wherein the pixel electrodes have the same double-layered structure as the data line, the common electrodes have the same double-layered structure as the gate line, the first mask process forms a common line substantially parallel and adjacent to the gate line, the common electrodes extend from the common line to the pixel region, the common line has the same double-layered structure as the gate line and is spaced apart from the gate line, and wherein the gate pad has the same double-layered structure as the gate line, and the data pad has the same double-layered structure as the data line.

3. The method according to claim 1, further comprising removing the first low resistance metallic layer of the gate pad so that the gate pad has a single-layered structure of the first barrier layer.

4. The method according to claim 1, further comprising removing the second low resistance metallic layer of the data pad so that the data pad has a single-layered structure of the second barrier layer.

5. A method of forming an array substrate for use in an in-plane switching liquid crystal display device, comprising:
   providing first and second substrates;
   sequentially forming a first barrier layer and a first low resistance metallic layer on a first substrate;
   simultaneously patterning the first barrier layer and the first low resistance metallic layer using a first mask process to form a gate line, a gate electrode, a gate pad and a plurality of common electrodes on the first substrate, wherein the gate line is disposed in a first direction, the gate pad is connected to one end of the gate line, the gate electrode extends from the gate line, and the plurality of common electrodes are disposed in a second direction perpendicular to an adjacent gate line, and wherein the gate electrode and the gate line have a first double-layered structure consisting of the first barrier layer and the first low resistance metallic layer; forming a gate insulating layer over the first substrate to cover the gate line, the gate electrode, the gate pad and the plurality of common electrodes;
   sequentially forming a pure amorphous silicon layer, a doped amorphous silicon layer, a second barrier layer and a second low resistance on the gate insulating layer;
   simultaneously patterning the pure and doped amorphous silicon layers and the second barrier and low resistance metallic layers using a second mask process to form a data line in the second direction, a data pad at one end of the data line, a source electrode extending from the data line, a drain electrode spaced apart from the source electrode across the gate electrode, a plurality of pixel electrodes in the second direction and arranged in an alternating pattern with the common electrodes, and a plurality of semiconductor layer under the data line, the data pad, the source and drain electrodes, and the plurality of pixel electrodes, wherein the semiconductor layer is a double-layered structure consisting of a first layer of pure amorphous silicon and a second layer of doped amorphous silicon, and wherein the data line defines a pixel region with the gate line, the pixel electrodes are connected to the drain electrode, and the data line and the source and drain electrodes have a second double-layered structure consisting of the second barrier layer and the second low resistance metallic layer;
   forming a passivation layer over the gate insulating layer to cover the data line, the data pad, the source electrode, the drain electrode, and the plurality of pixel electrodes;
   attaching the second substrate to the first substrate using a sealant;
   cropping peripheral portions of the second substrate to expose gate and data portions; and
   etching a portion of the passivation layer corresponding to the gate and data portions to expose the gate and data pads.

6. The method according to claim 5, wherein the pixel electrodes have the same double-layered structure as the data line, the common electrodes have the same double-layered structure as the gate line, the first mask process forms a common line substantially parallel and adjacent to the gate line, the common electrodes extend from the common line to the pixel region, the common line has the same double-layered structure as the gate line and is spaced apart from the gate line, the gate pad has the same double-layered structure as the gate line, and the data pad has the same double-layered structure as the data line.

7. The method according to claim 5, further comprising removing the first low resistance metallic layer of the gate pad so that the gate pad has a single-layered structure of the first barrier layer.

8. The method according to claim 5, further comprising removing the second low resistance metallic layer of the data pad so that the data pad has a single-layered structure of the second barrier layer.

9. The method according to claim 5, wherein patterning the first barrier layer and the first low resistance metallic layer and patterning the second barrier layer and the second low resistance metallic layer use a mixed etching solution including hydrogen peroxide ($H_2O_2$), an etching agent, a solution having fluoride (F), and an additive for controlling an etch profile.

10. The method according to claim 5, wherein the second mask process includes:
   forming a photoresist layer on the second low resistance metallic layer;
   providing a mask over the photoresist layer, the photoresist having a light-shielding portion, a light-transmitting portion, and a half transmitting portion;
   irradiating light on the photoresist layer through the mask;
   developing the photoresist layer exposed by the light to form a first photoresist pattern in a position corresponding to the source and drain electrodes, a second photoresist pattern in a position corresponding to the data pad and the data line, and a third photoresist pattern in a position corresponding to the pixel electrode, wherein the first photoresist pattern has a first and a second thickness;
   removing portions of the second low resistance metallic layer, the barrier layer, the doped amorphous silicon layer and the pure amorphous silicon layer, which are exposed among the first to third photoresist patterns; and
   ashing the first to third photoresist patterns until a portion having the first thickness is completely removed and then removing exposed portions of the second low resistance metallic layer, the barrier layer and the doped amorphous silicon layer until portions of the amorphous silicon layer are exposed.

* * * * *